United States Patent
Tanabiki et al.

(10) Patent No.: US 8,366,007 B2
(45) Date of Patent: Feb. 5, 2013

(54) SECURE DEVICE AND READER-WRITER

(75) Inventors: Masamoto Tanabiki, Kanagawa (JP); Yasuo Takeuchi, Tokyo (JP); Emi Tsurukiri, Tokyo (JP); Yasuhisa Tokuda, Tokyo (JP)

(73) Assignee: Panasonic Corporation, Osaka (JP)

( * ) Notice: Subject to any disclaimer, the term of this patent is extended or adjusted under 35 U.S.C. 154(b) by 1163 days.

(21) Appl. No.: 12/295,163

(22) PCT Filed: Mar. 29, 2007

(86) PCT No.: PCT/JP2007/056982
§ 371 (c)(1),
(2), (4) Date: Sep. 29, 2008

(87) PCT Pub. No.: WO2007/119594
PCT Pub. Date: Oct. 25, 2007

(65) Prior Publication Data
US 2009/0119516 A1    May 7, 2009

(30) Foreign Application Priority Data

Mar. 31, 2006 (JP) .................. 2006-098865
Mar. 22, 2007 (JP) .................. 2007-075217

(51) Int. Cl.
*G06K 19/05* (2006.01)
(52) U.S. Cl. ...................... 235/492; 235/487
(58) Field of Classification Search .......... 235/492, 235/487, 472.02, 476, 472.022
See application file for complete search history.

(56) References Cited

U.S. PATENT DOCUMENTS

| 6,094,656 | A | 7/2000 | De Jong |
| 6,233,683 | B1 | 5/2001 | Chan et al. |
| 6,466,991 | B1 * | 10/2002 | Moriyama et al. ........... 719/315 |
| 6,633,898 | B1 * | 10/2003 | Seguchi et al. ............... 709/201 |
| 7,337,976 | B2 * | 3/2008 | Kawamura et al. .......... 235/492 |
| 2003/0163717 | A1 | 8/2003 | Yoshimoto et al. |
| 2005/0234825 | A1 | 10/2005 | Andersson |
| 2006/0126422 | A1 | 6/2006 | Takagi et al. |

FOREIGN PATENT DOCUMENTS

| CN | 1441385 A | 9/2003 |
| CN | 1549198 A | 11/2004 |
| CN | 1726478 A | 1/2006 |

(Continued)

OTHER PUBLICATIONS

International Search Report for PCT/JP2007/056982; Jul. 4, 2007.

(Continued)

*Primary Examiner* — Daniel St.Cyr
(74) *Attorney, Agent, or Firm* — Pearne & Gordon LLP

(57) ABSTRACT

The invention is to solve a problem such that a server application that a secure device has cannot be used by a client application that a different secure device has.

A secure device according the invention has an application storage section 202 for storing a client application of an application for performing data processing; an address calculation section 205 for determining whether or not the application storage section 202 has a server application for transferring data to and from the client application; and a referent existence determination section 210, when the address calculation section 205 determines that the application storage section 202 does not have a first server application for transferring data to and from a first client application, for determining whether or not a different secure device has the first server application.

16 Claims, 35 Drawing Sheets

| | FOREIGN PATENT DOCUMENTS | |
|---|---|---|
| JP | 10-143774 A | 5/1998 |
| JP | 2001-188884 | 7/2001 |
| JP | 2002-73196 | 3/2002 |
| JP | 2002-216085 | 8/2002 |
| JP | 2003-196625 | 7/2003 |
| JP | 2003-522988 | 7/2003 |

OTHER PUBLICATIONS

Chinese Search Report dated Apr. 6, 2010.

* cited by examiner

FIG. 6
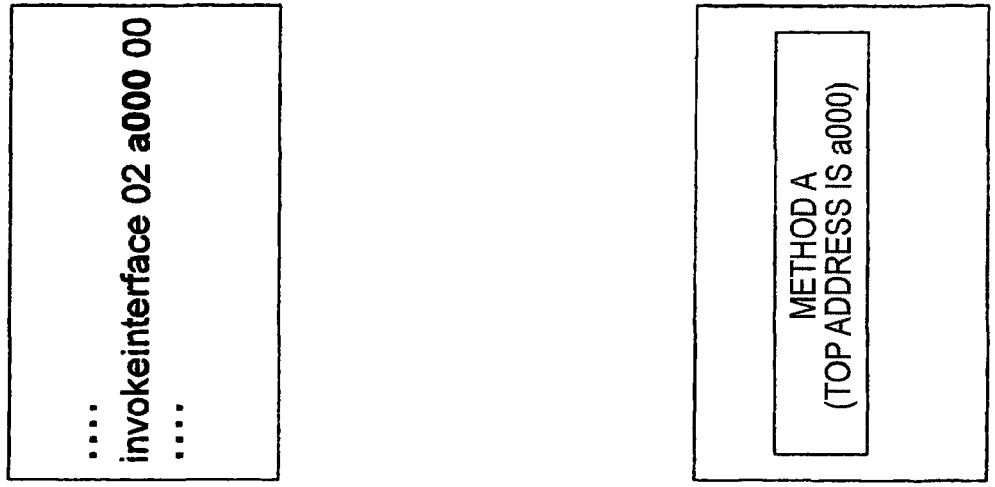
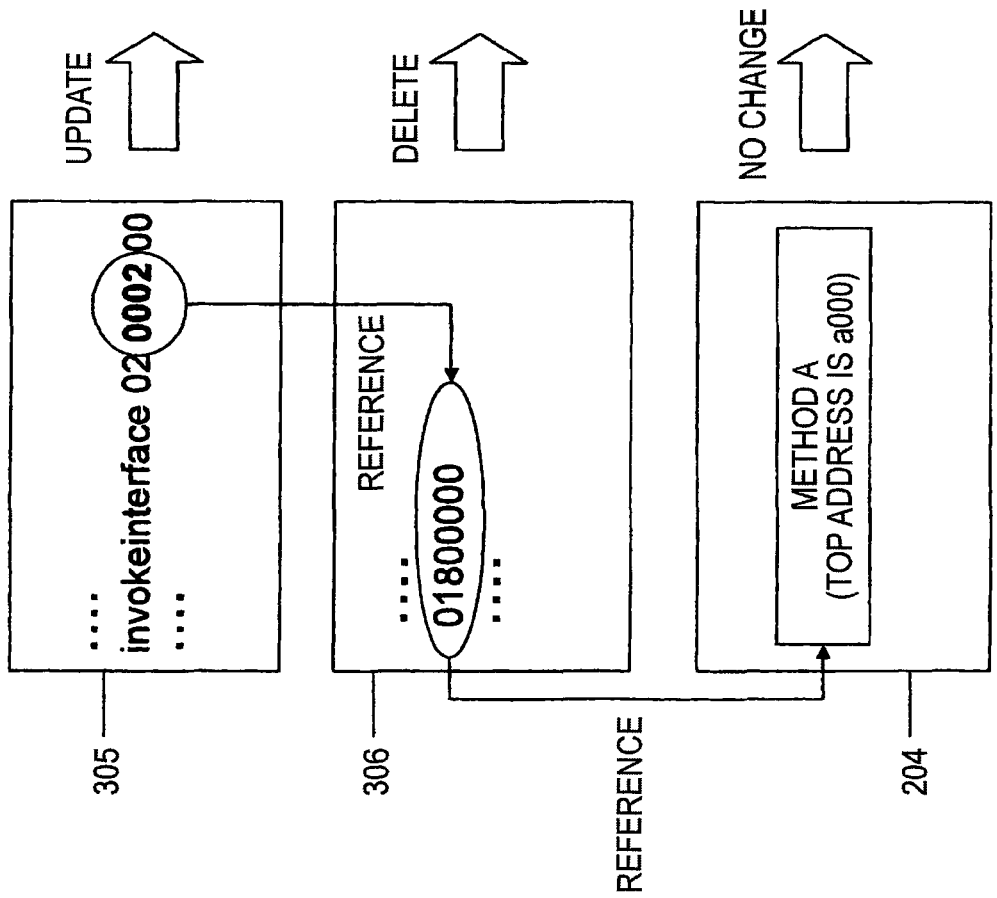

FIG. 9

901: AUTHORIZATION CODE TABLE

| INDEX | IDENTIFIER OF REFERENT APPLICATION (AID) | METHOD ID | NUMBER OF ARGUMENTS |
|---|---|---|---|
| 0 | .... | ... | ... |
| 1 | .... | ... | ... |
| 2 | 102030405060 | 4 | 1 |

FIG. 20

2001: AUTHORIZATION CODE TABLE

| INDEX | IDENTIFIER OF CLIENT APPLICATION | IDENTIFIER OF REFERENT APPLICATION | METHOD ID | NUMBER OF ARGUMENTS |
|---|---|---|---|---|
| 0 | 0102030405 | 102030405060 | 02 | 02 |
| 1 | 060708090a | 102030405060 | 02 | 02 |
| 2 | 0b0c0d0e0f10 | 102030405060 | 02 | 02 |

*FIG. 22*

2201: INSTRUCTION

[FOR AUTHORIZATION CODE]
  TOP ONE BYTE  FE-FFh
  LATTER-HALF ONE BYTE INDEX TO AUTHORIZATION CODE TABLE

[FOR AUTHORIZATION CODE]
  TOP ONE BYTE  FC-FDh
  FOLLOWING FOUR BYTES TYPE AND DESCRIPTION OF RESTRICTION
        EXAMPLE:  WHEN THE NUMBER OF USE TIMES IS THREE Bh
                  REPRESENTATION OF THE NUMBER OF USE TIMES BY TWO BITS 01
                  REPRESENTATION OF NUMBER OF TIMES 3 BY TWO BITS  11
  FOLLOWING FOUR BYTES INDEX TO AUTHORIZATION CODE TABLE

[FOR TEMPORARY AUTHORIZATION CODE]
  TOP ONE BYTE  FA-FBh,
  LATTER-HALF ONE BYTE PERMISSION CONDITION OF TEMPORARY STATE
        EXAMPLE: 01h: UNTIL EXECUTION OF APPLICATION TO WHICH TEMPORARY
                      AUTHORIZATION CODE IS ISSUED

FIG. 23

2301: TEMPORARY AUTHORIZATION CODE MANAGEMENT TABLE

| INDEX | IDENTIFIER OF CLIENT APPLICATION | IDENTIFIER OF REFERENT APPLICATION | ADDRESS CALCULATION DATA |
|---|---|---|---|
| 0 | 0102030405 | 102030405060 | 01800000 |
| 1 | | | |
| 2 | | | |

FIG. 27

| TAG | Length | Value |
|---|---|---|
| VALUE MEANING "SRETRUN" | LENGTH OF V | RETURN VALUE |

```
SHAREABLE DEFINITIONS AUTOMATIC TAGS ::=
BEGIN

SHAREABLE-Protocol ::= CHOICE{
    msgStart              Start,                   -- CORRESPONDS TO COMMAND 1
    respRequestHello      RequestHelloResponse,    -- CORRESPONDS TO RESPONSE 1101
    msgParentHello        ParentHello,             -- CORRESPONDS TO SELECTION COMMAND 1102
    respParentHello       ParentHelloResponse,     -- CORRESPONDS TO RESPONSE 1103
    msgNotifyInfo         NotifyInfo,              -- CORRESPONDS TO SHARE COMMAND 1104
    respNotifyInfo        NotifyInfoResponse,      -- CORRESPONDS TO RESPONSE 1105
    msgInvoke             Invoke,                  -- CORRESPONDS TO INVOKE COMMAND 1106 respInvoke            InvokeResponse,          -- CORRESPONDS TO RESPONSE 1107
    msgNotifyResults      NotifyResults,           -- CORRESPONDS TO SHARE COMMAND 1108
    msgNotifyResults      NotifyResultsResponse    -- CORRESPONDS TO RESPONSE 1109

Start ::= AID

RequestHelloResponse ::=SEQUENCE{
    parentAID      AID,
    responseStatus ErrorCode}

ParentHello ::= AID

ParentHelloResponse ::=SEQUENCE{
    ins            INS,
    objectID       ObjectID,
    responseStatus ErrorCode}
```

3301

SECURE DEVICE AND READER-WRITER

TECHNICAL FIELD

The present invention relates to a secure device and an external machine connected to the secure device.

BACKGROUND ART

At present, attention is focused on an IC card as a security device. A multi-application compatible card to allow an application to be downloaded thereto after the card is issued is developed for the purpose of improving the convenience of users and lowering barriers to entry of businesses wanting to provide IC card service.

Recently, a device including large-capacity memory in an IC chip available as an IC card expansion memory protection area (hereinafter, secure memory card) has been proposed, and it has been made possible to meet the need for a larger capacity of IC card application data. Since the secure memory card can be fitted to the size of a mobile machine, it can be expected that the secure memory card will be inserted directly into a mobile machine with a slot for development to use as EC (Electronic Commerce) service using the mobile machine.

Here, the hardware configuration of an IC card will be briefly reviewed.

FIG. 30 is a functional block diagram concerning the hardware of an IC card. An IC card 3001 includes a CPU (Central Processing Unit) 3002, ROM (Read Only Memory) 3003, volatile memory (for example, RAM: Random Access Memory) 3004, volatile memory (for example, EEPROM: Electrically Erasable Programmable Read Only Memory) 3005, and an I/O IF 3006. The CPU 3002 performs computation. The ROM 3003 is read-only memory that cannot be rewritten. The storage contents of the ROM 3003 are determined when the IC card is manufactured, and cannot later be changed. The RAM 3004 is memory that can be read and written. The contents of the EEPROM 3005 are retained if power is turned off. The I/O IF 3006 takes charge of data exchange between the IC card and an external system. A program executed in the CPU 3002 usually is called "application" (which will be hereinafter referred to as app). A code to execute the application is stored in the ROM 3003 or the EEPROM 3005. In addition to the components shown in FIG. 30, the IC card may include a cryptographic coprocessor for cryptographic operation.

The application installed in the IC card and an external system (reader) exchange data using an APDU (Application Protocol Data Unit) defined in ISO/IEC 7816-4. The APDU is made up of a command given to the IC card by the reader and a response returned from the IC card to the reader.

FIG. 31 shows an APDU command 3101 and is made up of a header and a main body. The main body has any desired length and may not exist if it is blank. The header is made up of a class (CLA), an instruction (INS), and parameters 1 and 2 (P1 and P2).

FIG. 32 shows an APDU response command 3201 and is made up of a data part and a Status Word (SW).

The IC card has a feature of an application fire wall. The application fire wall means that when a plurality of applications exist together in the IC card, one application cannot call a function of a different application or make data access to an object of a different application unless the different application explicitly gives an interface for access.

Sharable Interface Object (SIO) is known as an object sharing method between apps. (Refer to patent document 1.)

Hereinafter, an application for providing the SIO will be referred to as server application and an application using the SIO will be referred to as server application.

For example, proposed is a method effective for displaying the use result of an IC card having no display by inserting an IC card (chip) installing two types of applications into a mobile telephone, passing through the ticket examination by conducting noncontact communications between a ticket examining machine and a ticket examining application, passing the result to a display application by the ticket examining application in the card, and displaying the result on a screen of the mobile telephone by conducting contact communications with the display application by the mobile telephone.

In this example, the ticket examining application functions as a client application and the display application functions as a server application.

Patent document 1: International Patent Publication No. 2003-522988

DISCLOSURE OF THE INVENTION

Problems to be Solved by the Invention

To use a device such as an IC card for passing through the thick examination or entering and leaving check, it is expected that the whole processing will be complete in one to several seconds or so. Since the CPU processing capability of the IC card is low as compared with a general PC or mobile machine, often a link is executed at the downloading time and an immediate value is set as an address referent. A technique of calling memory for use as required like Dynamic Link Library cannot be used for an IC card application because the link processing becomes a bottleneck.

Therefore, to many IC cards, if a client application is downloaded in a state in which a server application is not installed, it results in failure as a link error.

Thus, it is necessary for the server application and the client application to exist in the same card in the already existing art.

However, some of server applications may be used from a plurality of client applications and to install the same server application in all possessed cards, the most of the limited memory of the IC card cannot be efficiently used.

The invention is embodied for solving the problems in the related arts and it is an object of the invention to provide a method for permitting download if a server application does not exist in the same card when a client application is downloaded and operating in conjunction with a server application installed in a different card when the client application is executed (which will be hereinafter referred to as inter-card IF use).

Means For Solving the Problems

The invention is a secure device having an application storage section for storing a client application of an application for performing data processing; an address calculation section for determining whether or not the application storage section has a server application for transferring data to and from the client application; and a referent existence determination section, when the address calculation section determines that the application storage section does not have a first server application for transferring data to and from a first client application, for determining whether or not a different secure device has the first server application.

Accordingly, if no server application exists in the home secure device, a check can be made to see if the client application of the home secure device can be executed according to the server application of the different secure device.

Advantages of the Invention

The invention has the advantage that the memory area in the secure device can be reduced.

BRIEF DESCRIPTION OF THE DRAWINGS

FIG. 6 is a flowchart of processing when a referent exists in a card.
FIG. 9 is a drawing to show an example of an authorization code table.
FIG. 20 is an example of an authorization code table in embodiment 5.
FIG. 22 is a drawing to show an example of an instruction.
FIG. 23 is a drawing to show an example of a temporary authorization code management table.
FIG. 27 is a drawing to show an example of data created by a stack control section.

FIG. 33a is a drawing (1) to show data type definition handled by the reader-writer.

DESCRIPTION OF REFERENCE NUMERALS

Figure 1:
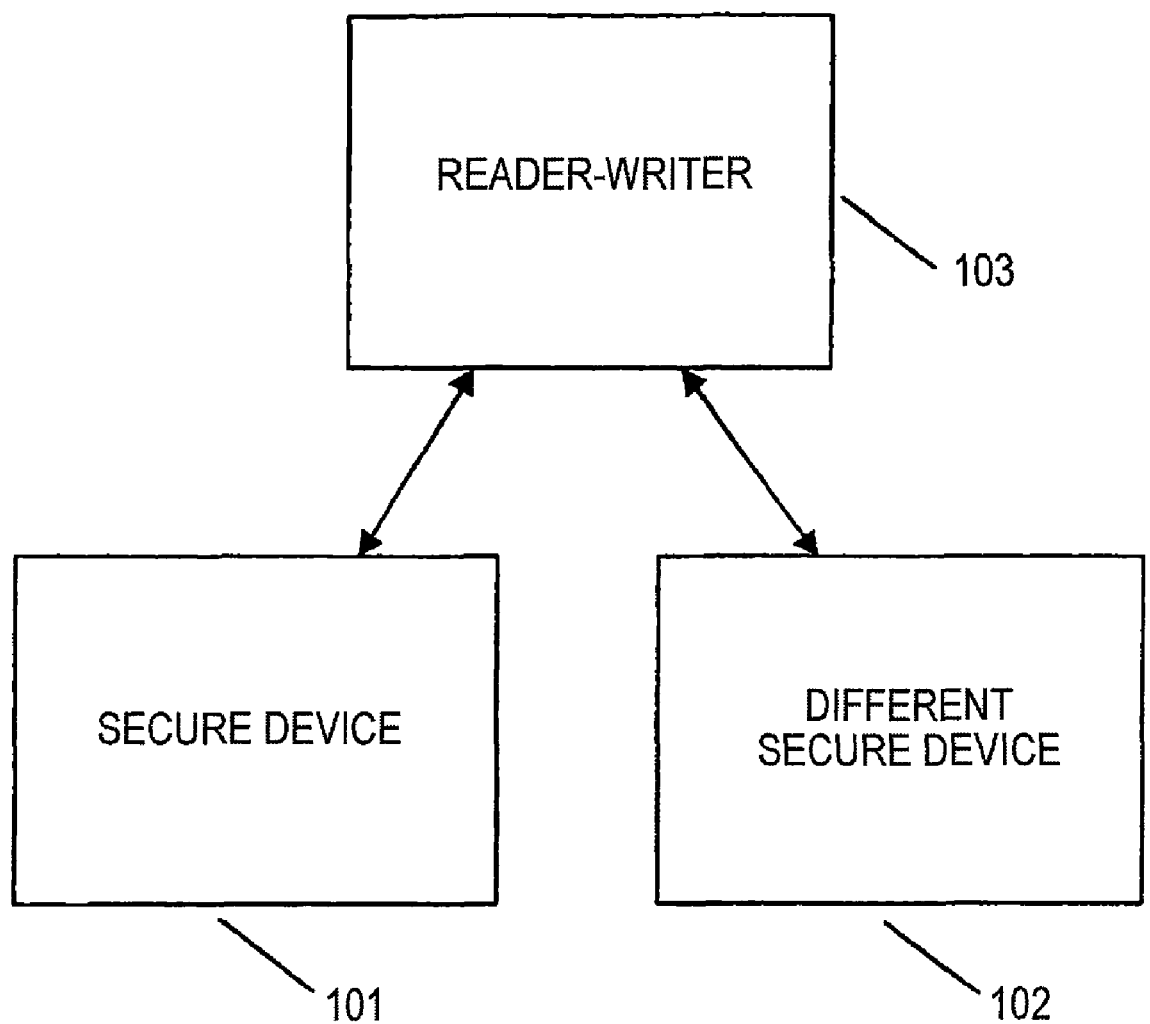
FIG. 1 is a drawing of the system configuration in embodiment 1 of the invention.

101 Secure device
102 Different secure device
103 Reader-writer
201 Download management section
202 Application storage section
203 Application (being downloaded)
204. Different application (already downloaded)
205 Address calculation section
206 Application execution section
207 Authorization code issuing section
208 Inter-card IF execution section
209 Authorization code management section
210 Referent existence determination section
301 Application being downloaded
302 Application code data area
303 Application calculation data area
304 Application data area
305 Application code data
306 Application calculation data
307 Application after downloaded
308 Application code
309 Down data
401 Server app
501 Exclusive control communication section
502 Application control section
801 Memory space
802 Area permitted for app
803 System area
901 Authorization code table
1101, 1103, 1105, 1107 Response
1102 Selection command
1104, 1108 Share command
1106 INVOKE command
1201 Secure device
1202 Security management section
1301 Secure device
1302 Inter-card IF execution section
1303 Security management section
1401. Input to reader-writer (response from secure device)
1402 Output from reader-writer (command to different secure device)
1403 Input to reader-writer (response from different secure device)
1404 Output from reader-writer (command to secure device)
1501 Reader-writer
1502 Owner management section
1701 Reader-writer
1702 Owner check information input section
1703 Download condition determination section
2001 Authorization code table
2201 Instruction
2301 Temporary authorization code management table
2401 Secure device
2402 Client app
2403 Stack operation section
2501 Different secure device 2502 Stack control section
2601 Part of app
2602 Frame 1
2603 Frame 2 ROM
2604 Stack
2605 Local variable
2701 Response data
3001 IC card
3002 CPU
3003 ROM
3004 RAM
3005 EEPROM
3006 I/O IF
3101 APDU command
3201 APDU response
3301 Data structure definition book handled by reader-writer

BEST MODE FOR CARRYING OUT THE INVENTION

The invention relates to a secure device for permitting download if a server application does not exist in the same card when a client application is downloaded and operating in conjunction with a server application installed in a different card when the client application is executed.

Embodiment 1 is the invention relating to a secure device for permitting download if a server application does not exist in the same card when a client application is downloaded and operating in conjunction with a server application installed in a different card when the client application is executed.

Embodiment 2 is the invention relating to a system for providing security when devices operate in conjunction with each other.

Embodiment 3 is the invention relating to a system (No. 1) for checking the sameness of the owner of a secure device and the owner of a different secure device when the devices operate in conjunction with each other.

Embodiment 4 is the invention relating to a system (No. 2) for checking the sameness of the owner of a secure device and the owner of a different secure device when the devices operate in conjunction with each other.

Embodiment 5 is the invention relating to a use control method of a client application in association with the life cycle of a secure device in which a server application is installed.

Embodiment 6 is the invention relating to a conditional download method of a client application and a condition check method when a serve application does not exist in the same card.

Embodiment 7 is the invention relating to a method of requesting a server application installed in a different secure device to perform processing and using the process data of the server application in a client application.

The embodiments of the invention will be discussed with the accompanying drawings. It is to be understood that the invention is not limited to the specific embodiments described below and that the invention can be embodied in various forms without departing from the spirit and the scope of the invention.

Embodiment 1

The invention described in embodiment 1 provides a secure device for permitting download if a server application does not exist in the same card when a client application is downloaded and operating in conjunction with a server application installed in a different card when the client application is executed.

For example, the case where the invention is applied to a secure device involving a display application for displaying the processing result of a client application on a screen of a mobile telephone as a server application and a commutation ticket application and a prepaid application as client applications is possible.

Alternatively, the invention can also be applied to an example wherein in the relationship between a server application for checking the viewing right and a client application for storing the viewing right and viewed content, the client application passes the viewing right to the sever application and the content cannot be viewed unless condition check of the age, the number of times, the expiration date, the total playback time, etc., involved in the viewing right, executed by the server application is passed.

The embodiment will be discussed with FIGS. 1 to 11 and 28.

FIG. 1 is a drawing to show a conjunction system of a secure device and a different secure device in the embodiment, and the conjunction system is made up of a secure device 101, a different secure device 102, and a reader-writer 103.

Figure 2:
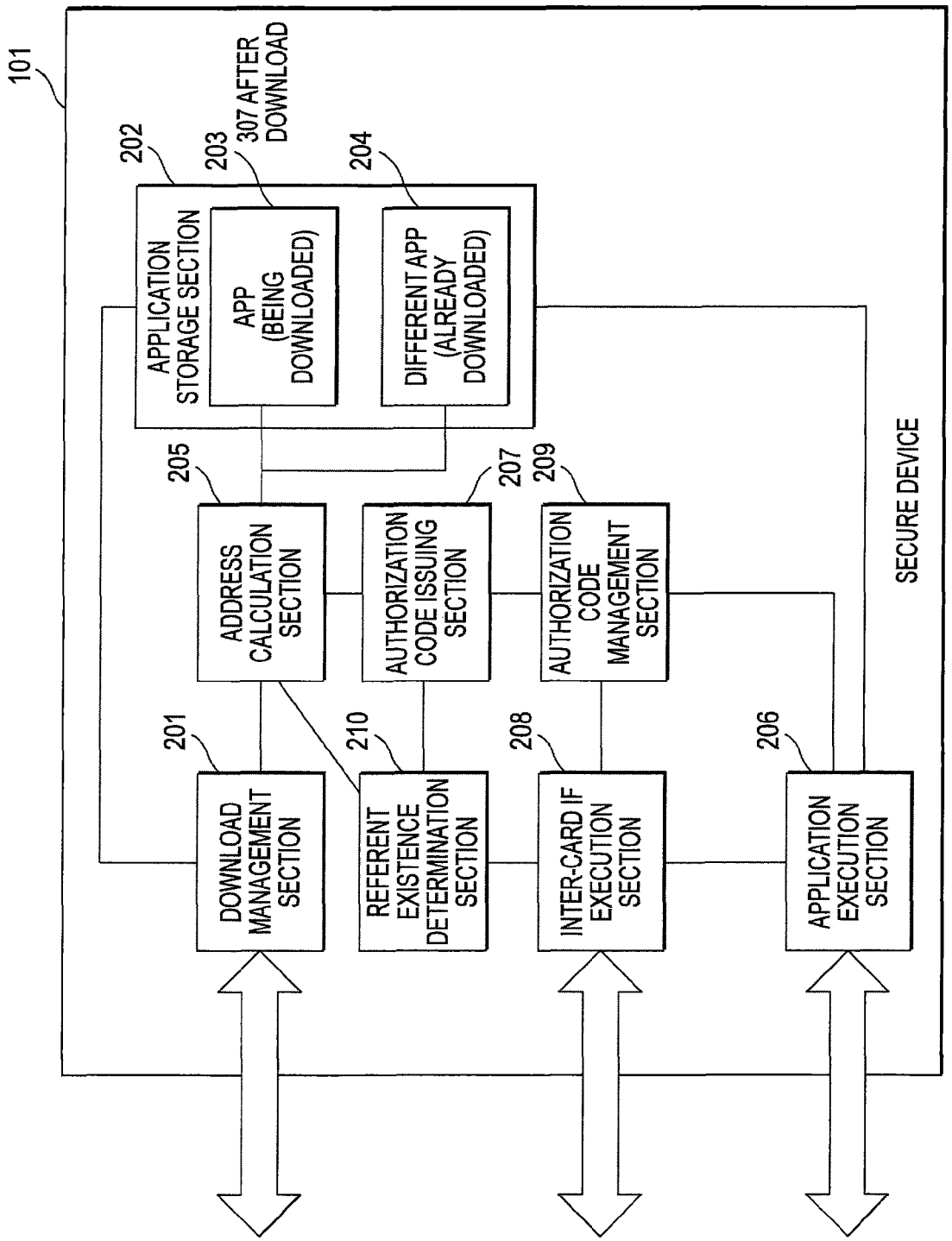
FIG. 2 is a block diagram of a secure device in embodiment 1.
Figure 4:
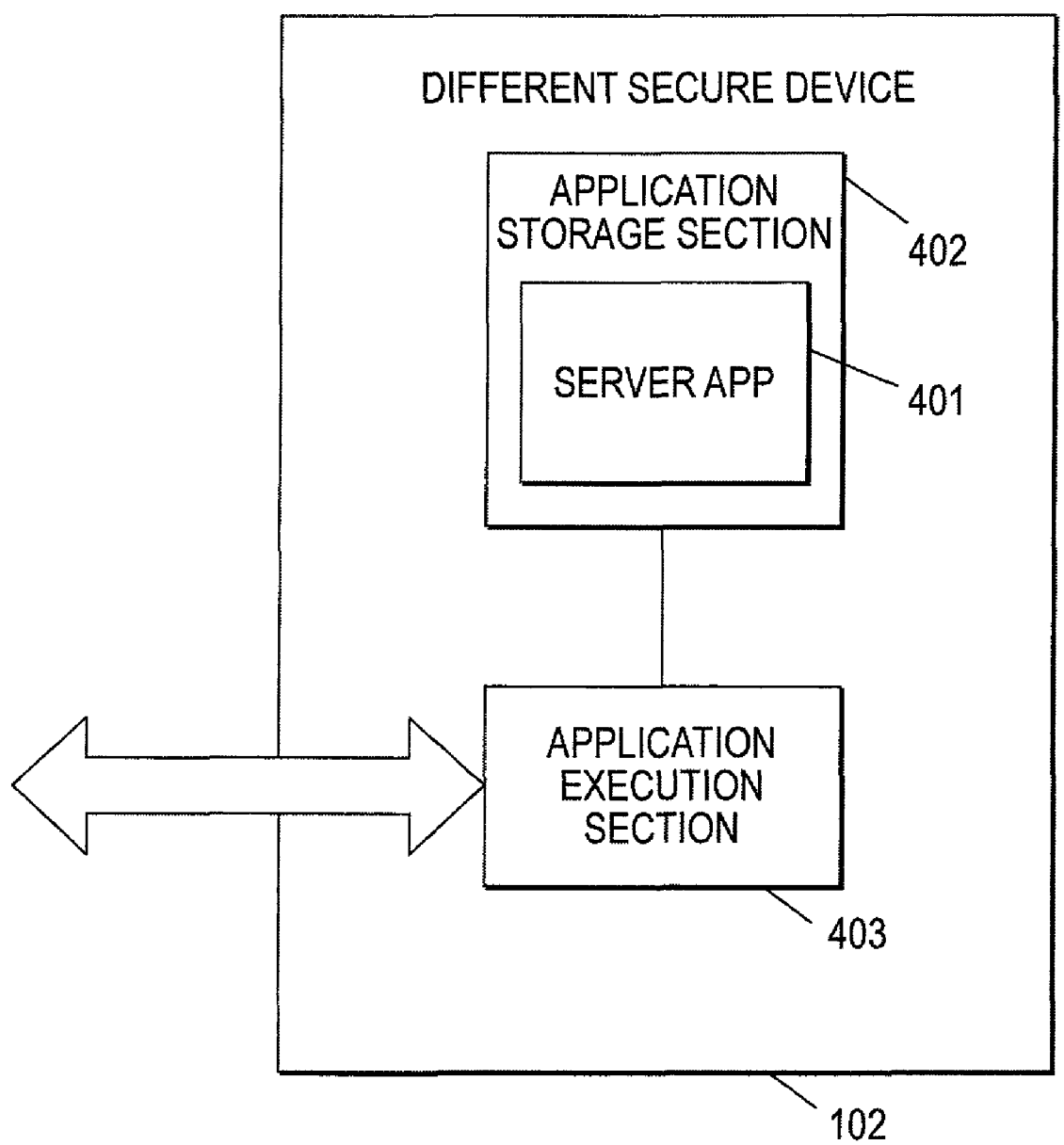
FIG. 4 is a block diagram of a different secure device in embodiment 1.
Figure 5:
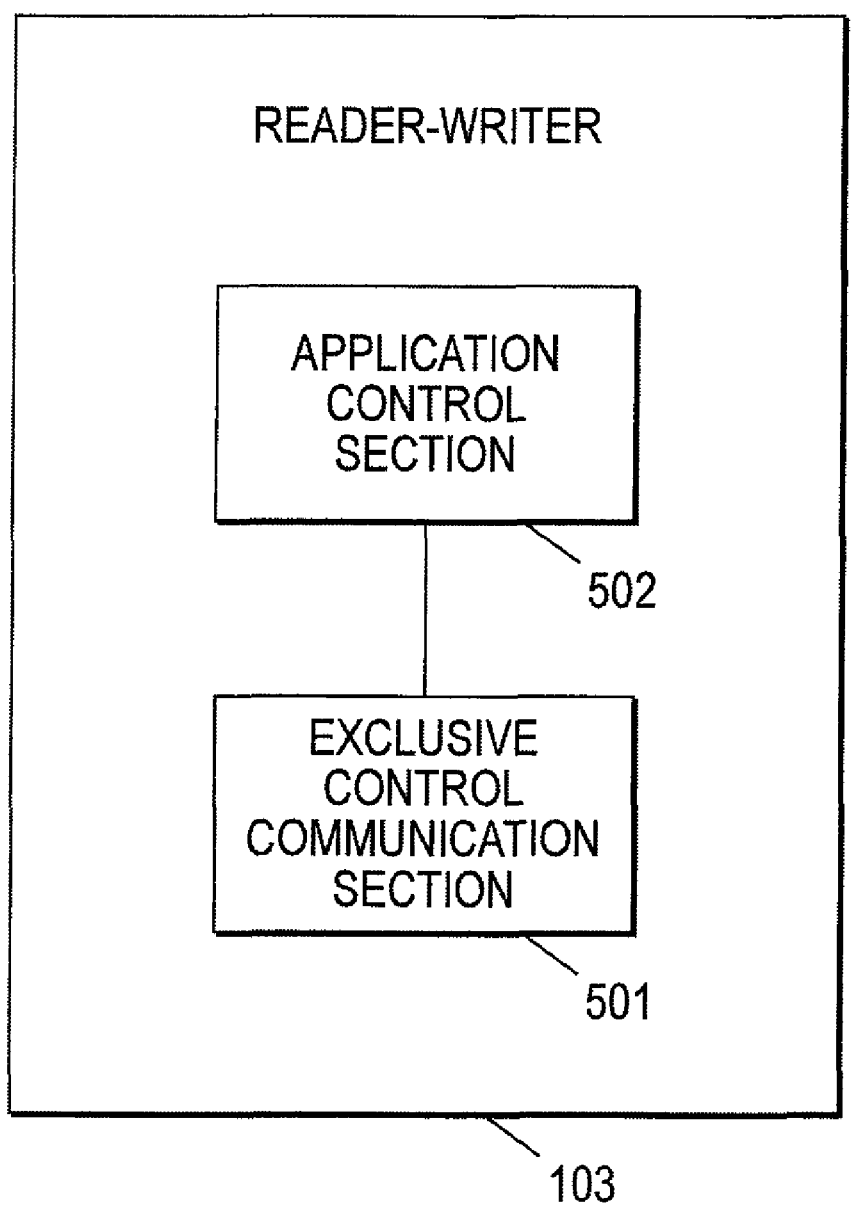
FIG. 5 is a block diagram of a reader-writer in embodiment 1.

FIGS. 2, 4, and 5 are block diagrams of the secure device 101, the different secure device 102, and the reader-writer 103 shown in FIG. 1 respectively.

FIG. 2 is a block diagram to show the configuration of the secure device 101 as mentioned above.

A download management section 201 conducts communications with the reader-writer 103 and manages the operation for downloading an application to the secure device 101.

An application storage section 202 contains an application 203 being downloaded and an application 204 already downloaded.

Figure 3:
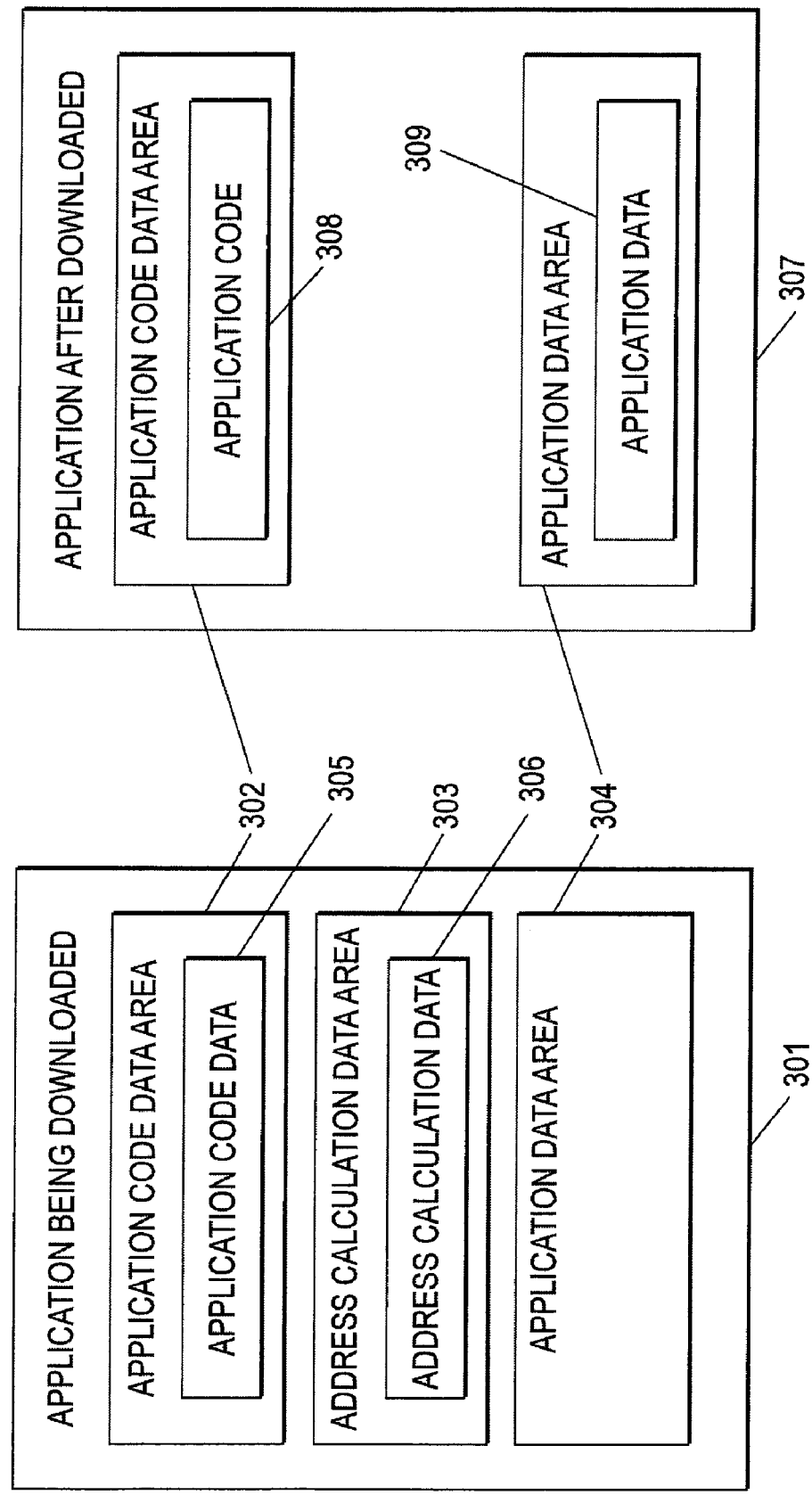
FIG. 3 is a drawing to show application areas during downloading and after downloading.

FIG. 3 shows the areas occupied by the applications in the application storage section 202 in FIG. 2.

The areas reserved by the application 301 (203) being downloaded are an application code data area 302, an address calculation data area 303, and an application data area 304.

Application code data 305 is stored in the application code data area 302, and address calculation data 306 is stored in the address calculation data area 303.

The areas occupied by an application 307 after downloaded are the application code data area 302 and the application data area 304. Application code 308 is stored in the application code data area 302, and application data 309 is stored in the application data area 304.

An address calculation section 205 executes "address resolution" of the application 203 to be downloaded using the application code data 305 and the application calculation data 306 in the application 203 being downloaded and the different application 204 already downloaded.

The "address resolution" refers to updating of the address of the referent to direct data at the function call or object access time.

After the address resolution, the address calculation data area 303 is deleted and after completion of download, the application 307 made up of the application code 308 and the application data 309 is stored in the application storage section 202 as the already downloaded application.

The already downloaded application 307 is executed by an application execution section 206 of the secure device 101 according to a command from the reader-writer 103.

For example, an art wherein byte code is stored as the application code 308 and an object is stored as the application data 309 in the application storage section 202 and a virtual machine as the application execution section 206 interprets the byte code and performs processing is widely known.

Such a processing system is used in the description of embodiments in the Description including embodiment 1. Each address in the memory space managed by the virtual machine is represented as 16 bits (two bytes).

An authorization code issuing section 207 issues "authorization code" upon reception of a request from the address calculation section 205 during address resolution. The "authorization code" is described later.

At this time, a referent existence determination section 210 checks whether or not "referent exists in different secure device." This operation is described later.

An inter-card IF execution section 208 conducts communications with the different secure device 102 upon reception of a request from the referent existence determination section 210 during address resolution or a request from the application execution section 206 at the execution time of the application 307.

FIG. 4 is a block diagram to show the configuration of the different secure device 102 as mentioned above.

In the different secure device 102, an application for providing an interface for the different application 204 to explicitly access (which will be hereinafter referred to as server application 401. On the other hand, an application using the interface will be hereinafter referred to as client application 307 (in FIG. 2, the application 307 after downloaded).) is stored in an application storage section 402 and is executed by an application execution section 403.

FIG. 5 is a block diagram to show the configuration of the reader-writer 103 as mentioned above.

The reader-writer 103 can communicate with a plurality of secure devices of the secure device 101, the different secure device 102, etc., and individually recognizes the secure device 101 and the different secure device 102 for conducting communications.

To perform the operation mentioned above, the reader-writer 103 is made up of an exclusive control communication section 501 for preventing data to be transmitted to the secure device 101 from being transmitted to the different secure device 102 (and vice versa) by mistake and an application control section 502 for sending a command to the application 307 in the secure device 101 and the server application 401 in the different secure device and processing a response.

For example, a reader-writer provided with a plurality of slots for coming in contact with a secure device inserted into each slot and communicating with the secure device, a reader-writer for conducting noncontact communications with a plurality of secure devices within the reach of radio waves, and the like are known.

The application control section 502 may be 1) the case where all exists in the reader-writer 103 or 2) the case where a part exists in the reader-writer 103 and the remaining part exists in a different apparatus through a network; both are handled similarly in Description.

In the embodiment, data transfer among the secure device 101, the different secure device 102, and the reader-writer 103 having the components described above will be discussed.

In the application containing the embodiment, basically a control section (not shown) executes transfer of data, etc., unless explicitly mentioned otherwise.

Figure 28:
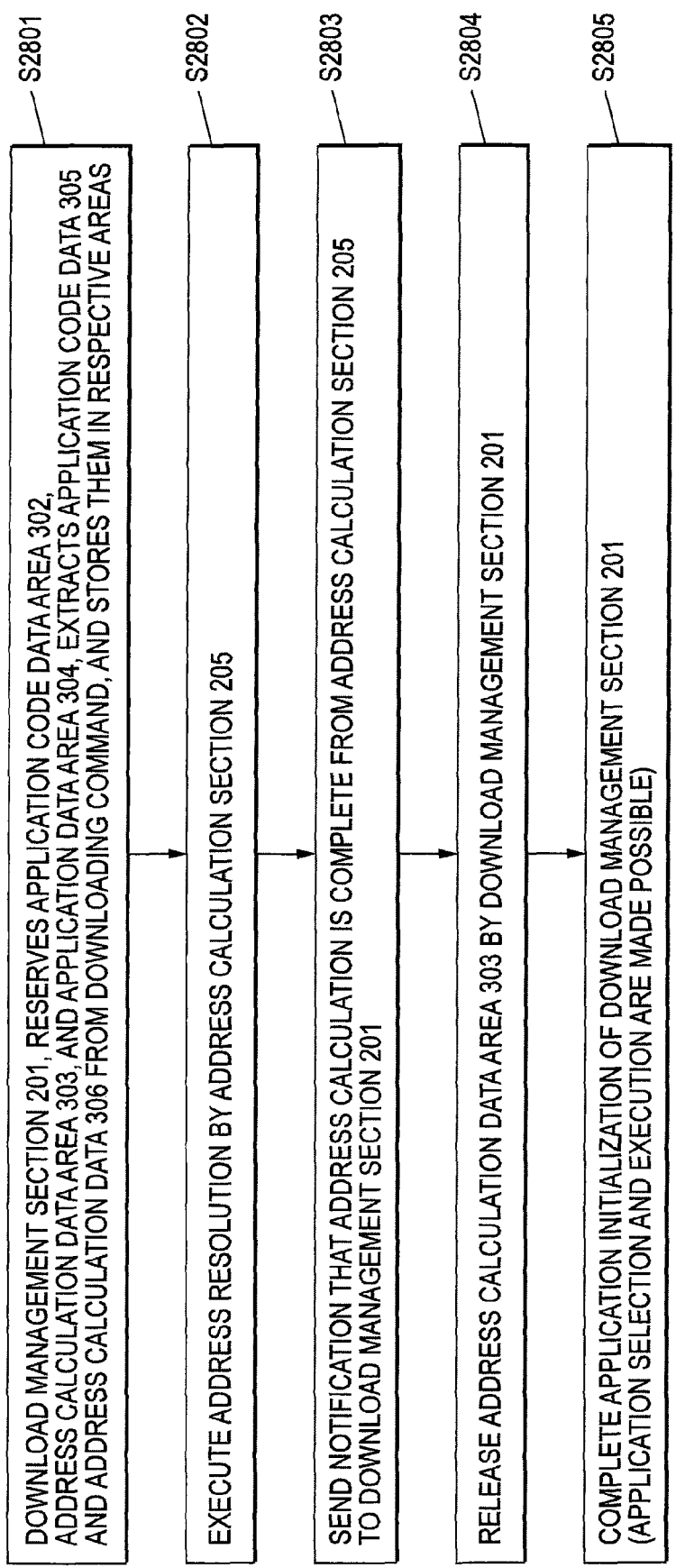
FIG. 28 is a flowchart of downloading an application when the referent application exists in the same secure device.

Before description of the characteristic portion of the embodiment, first, application download when the application of the referent exists in the same secure device will be discussed with FIGS. 7 and 28.

The download management section 201 in the secure device 101 receives an application downloading command transmitted from the reader-writer 103 and transmits the processing result to the reader-writer 103 as a response. Basically, application download is executed by repeating the operation.

(STEP 1 (S2801))

In the secure device 101, the application code data area 302, the address calculation data area 303, and the application data area 304 are reserved in response to the size specified in the downloading command transmitted from the reader-writer 103, and the application code data 305 and the address calculation data 306 are extracted from the downloading command and are stored in the respective areas.

(STEP 2 (S2802))

In the secure device 101, after the application code data 305 and the address calculation data 306 are extracted, the address calculation section 205 executes address resolution upon reception of a request from the download management section 201.

The address calculation section 205 interprets in byte units starting at the top of the application code data 305. For example, when reading "invokeinterface" of an instruction code for calling a function via IF (interface) provided by the different application 204, the address calculation section 205 performs processing responsive to "invokeinterface," as shown in FIG. 6.

The "processing responsive" means that various instruction codes such as "invokeinterface" are defined and processing varies from one instruction code to another.

One byte immediately following "invokeinterface" controls the argument to be called and "0002" of the following two bytes is an index of the address calculation data 306. The address calculation section 205 refers to the corresponding address calculation data 306 based on the index of the address calculation data 306.

Referent "01800000" shown in FIG. 6 is made up of package, class token, method identification number, etc., and the address calculation section 205 uses them to extract the address indicating the top position of the function to be called and converts the index "0002" into called address "a000."

(STEP 3 (S2803))

In the secure device 101, after interpreting all of the application code data 305, the address calculation section 205 sends a notification that the address calculation is complete to the download management section 201.

(STEP 4 (S2804))

In the secure device 101, the download management section 201 releases the area 303 storing the address calculation data which becomes unnecessary. However, the step may be optional although it is very effective considering the memory resources of the card.

(STEP 5 (S2805))

When receiving an "application initialization" request command from the reader-writer 103, the download management section 201 initializes applications.

The "application initialization" is to generate an instance of each application and set the initial value in the object. The data is stored in the application data area 304 as the application data 309.

After this, it is made possible for the application execution section 206 to select and execute the application 307 or 204 for a command from the reader-writer 103.

The processing when address resolution results in success has been described.

Next, the case where address resolution cannot be executed because the application to be referred to does not exist in the card will be discussed with FIG. 7.

Figure 7:
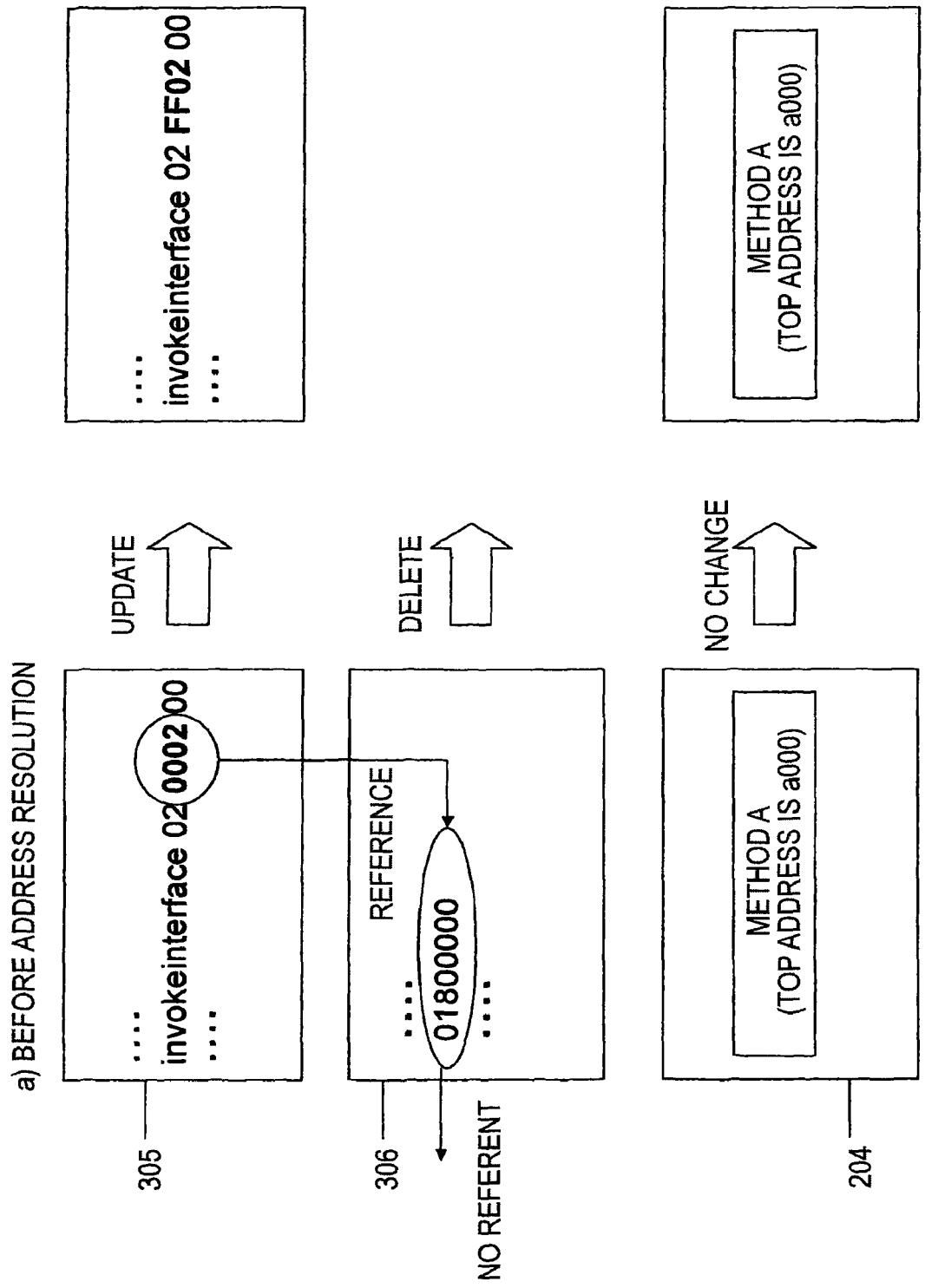
FIG. 7 is a flowchart of processing when no referent exists in a card.

In FIG. 7, to execute address resolution of a function call of the different application as at (STEP 2 (S2802)) described above, the address calculation section 205 recognizes that no referent exists in the secure device 101.

The address calculation section 205 requests the referent existence determination section 210 to check "whether or not the corresponding referent exists in the different secure device 102."

At this time, the address calculation section 205 passes existence check information containing identifier Application Identification Data (AID), method ID, the number of arguments, etc., of the referent application to the referent existence determination section 210.

The existence check information is passed from the referent existence determination section 210 to the inter-card IF execution section 208, which then transfers the existence check information to the different secure device 102 through the reader-writer 103.

The different secure device 102 checks that the function indicated by the existence check information exists, and then transfers permission check information meaning use permission or use refusal to the secure device 101.

The permission check information received by the inter-card. IF execution section 208 of the secure device 101 is passed to the referent existence determination section 210 and if use of the server application 401 of the different secure device 102 is permitted as a result of checking the permission check information by the referent existence determination section 210, the authorization code issuing section 207 is requested to issue an authorization code. If the use is refused, the authorization code issuing section 207 issues an error.

If an error is issued, SW meaning that "download resulted in failure because no referent exists" is returned to the reader-writer 103 through the download management section 201.

The length of the authorization code is the same length as updated essentially as an address; for example, if the address is represented by two bytes, the authorization code is also two bytes.

The authorization code is made up of information indicating an address area where application placement is not permitted and the index of a table managed by an authorization code management section.

Figure 8:
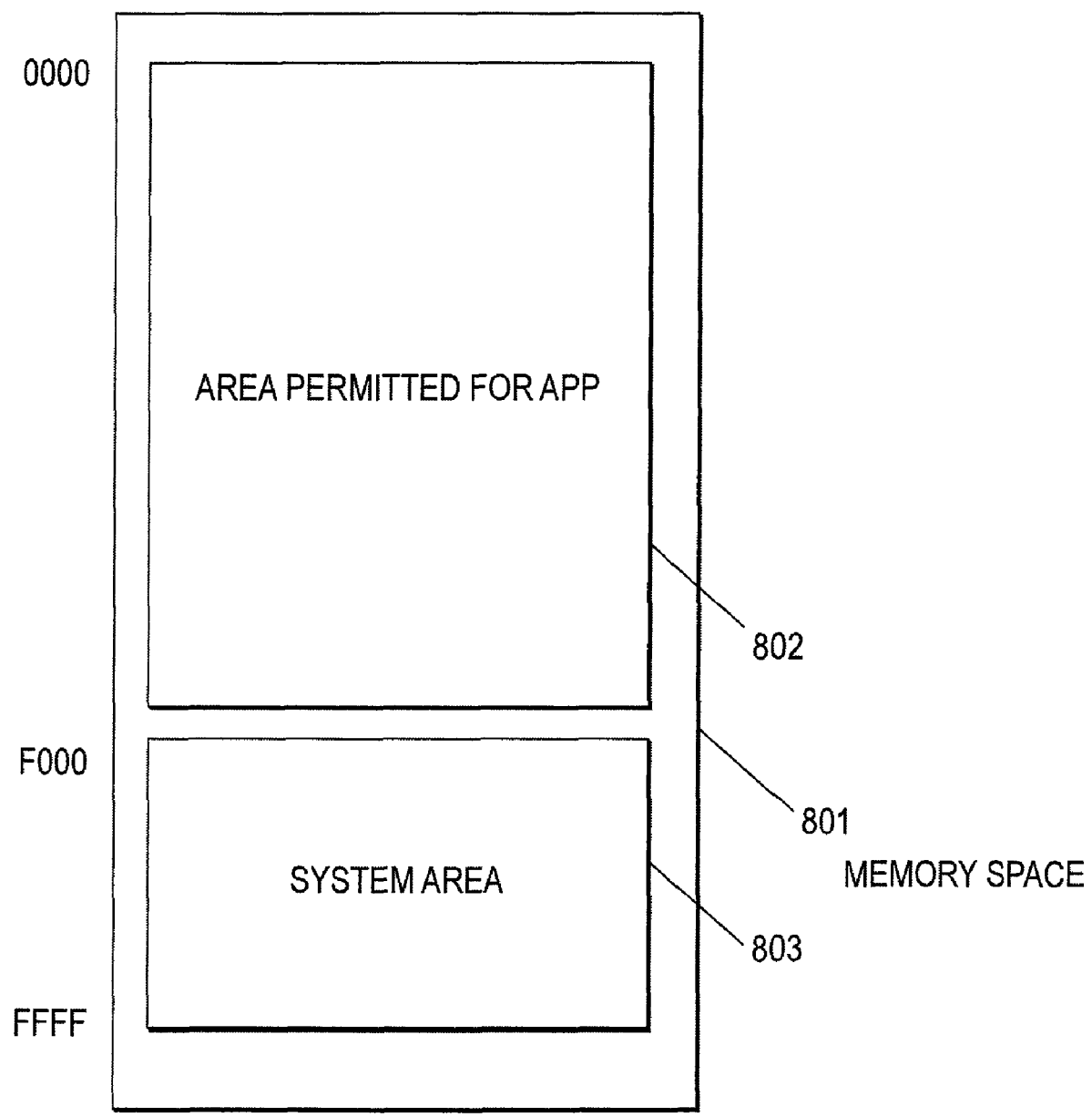
FIG. 8 is a drawing to show address space in embodiment 1.

FIG. 8 shows address space in the secure device 101.

When memory space 802 permitted for application placement in memory space 801 is indicated by 0000h to EFFFh, an area not permitted for the application (for example, system area) 803 is F000h to FFFFh.

For example, as the authorization code, FF02h indicating index "2" of a table within the range of the area not permitted for the application 803 and by one byte of the latter half is given. In this case, after the authorization code is issued, the identifier of the referent application (server application 401), the method ID, the number of arguments, and the like are stored in the row of the index "2" of an authorization code table 901 managed by an authorization code management section 209.

Next, the execution operation of the application given the authorization code (client application 307) will be discussed with FIGS. 10 and 11.

Figure 10:
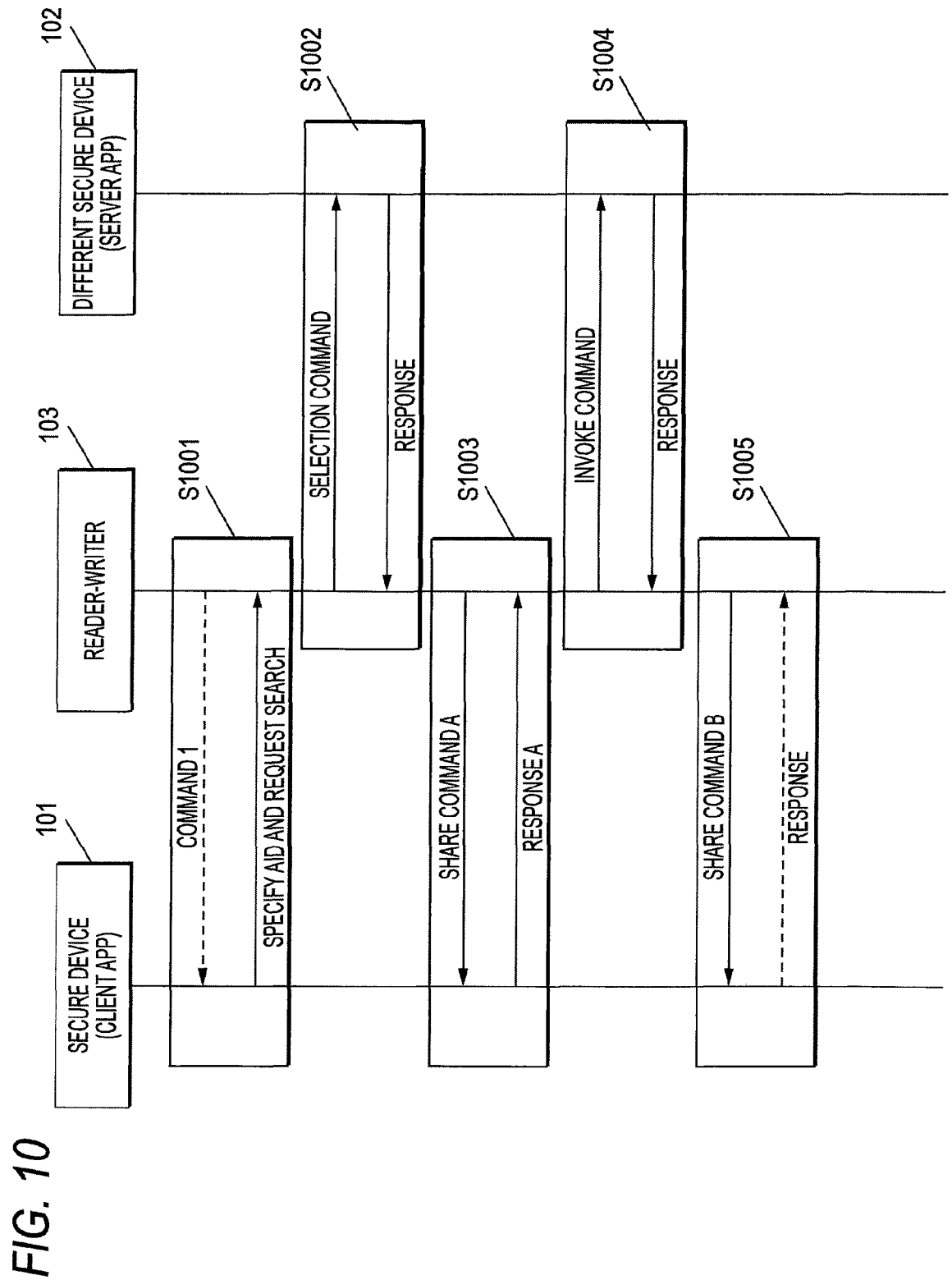
FIG. 10 is a flowchart of processing of an application given an authorization code.
Figure 11A:
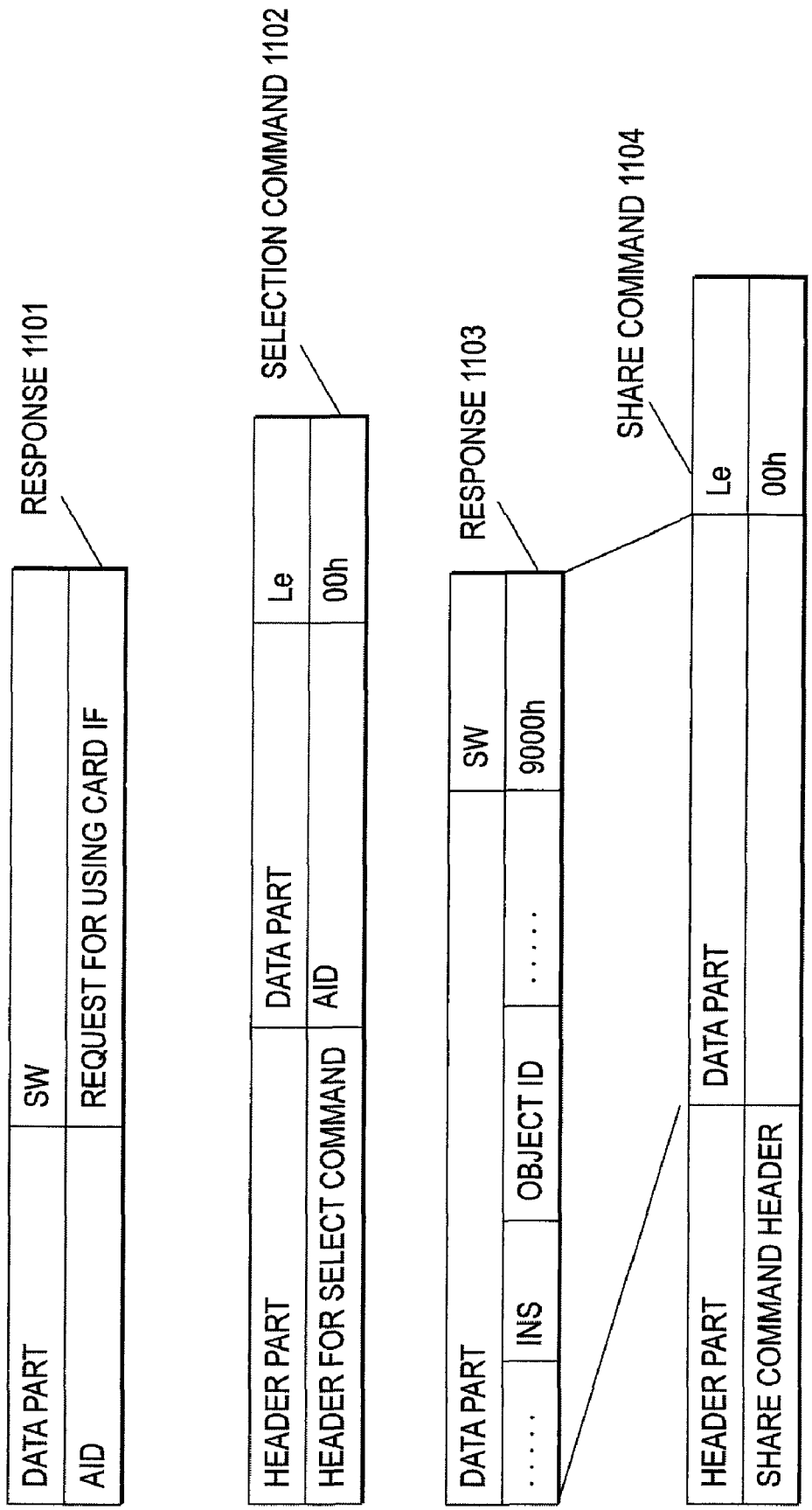
FIG. 11a is a drawing (a) to show an example of commands and responses.
Figure 11B:
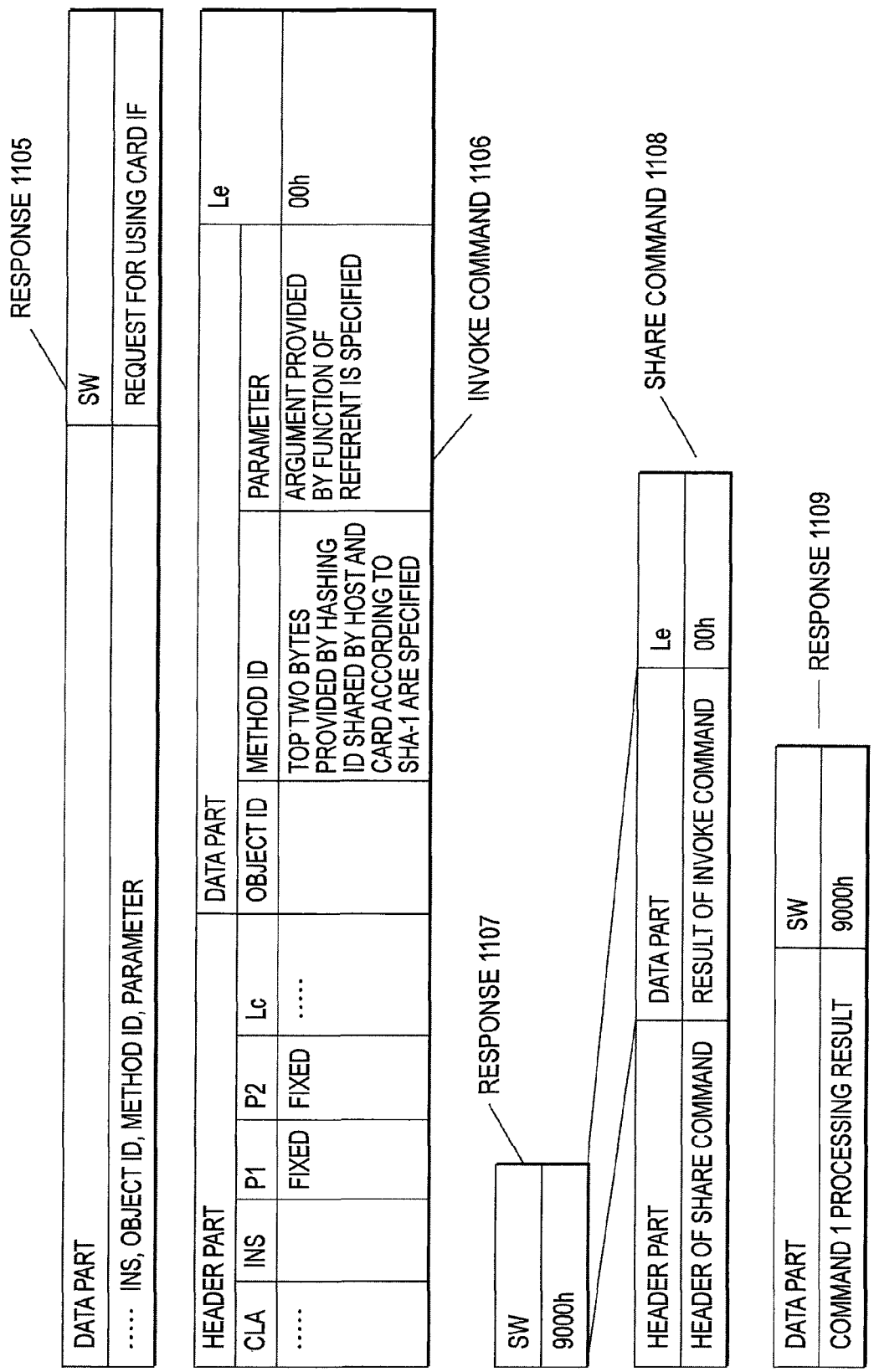
FIG. 11b is a drawing (b) to show an example of commands and responses.

FIG. 10 shows an operation flow and FIG. 11 shows an example of commands and responses communicated among the secure device 101, the different secure device 102, and the reader-writer 103.

The operation of the secure device 101, the different secure device 102, and the reader-writer 103 will be discussed with the operation flow in FIG. 10.

Figure 33B:
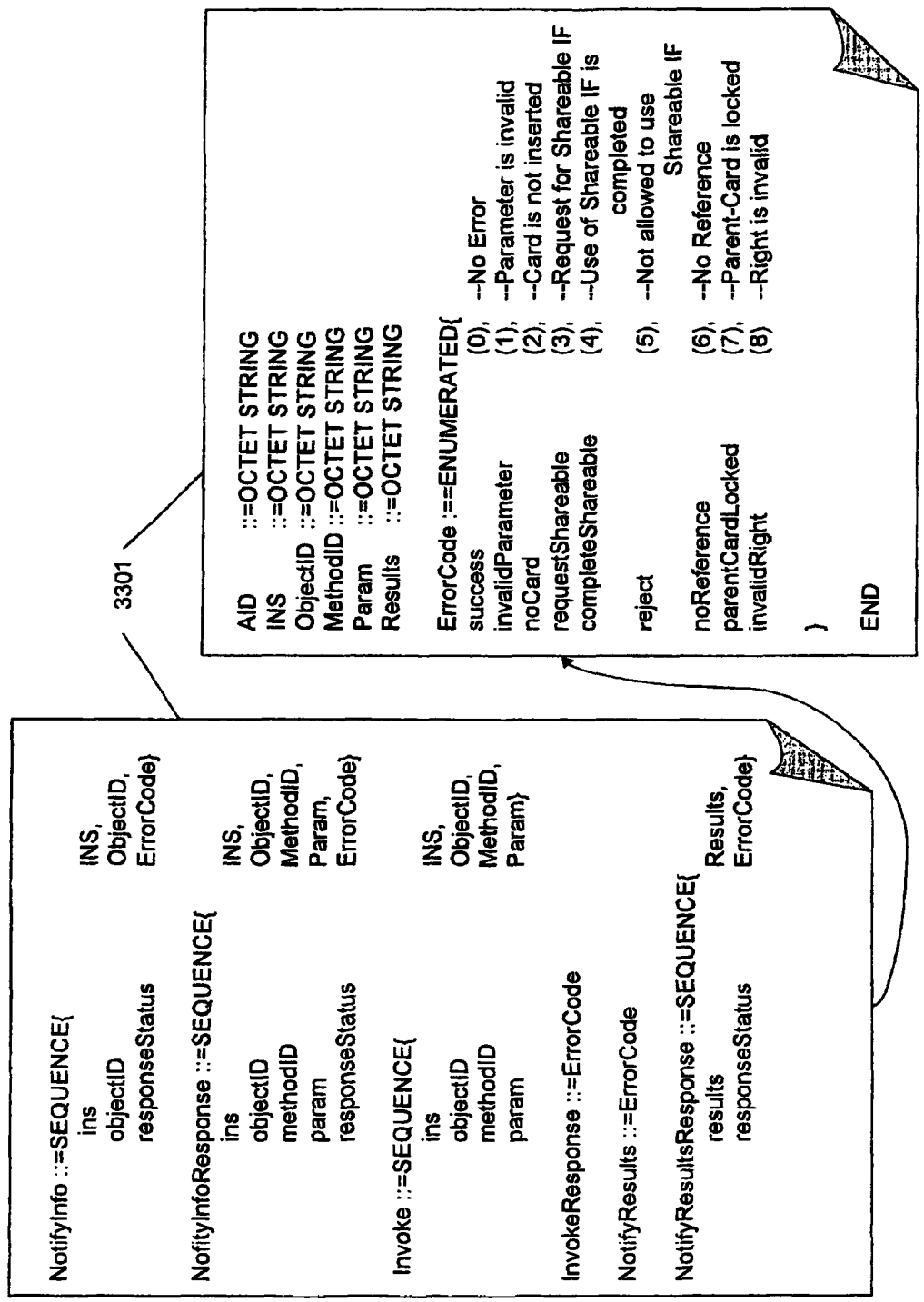
FIG. 33b is a drawing (2) to show data type definition handled by the reader-writer.

FIG. 33 shows a definition book 3301 describing the structure of data handled by the reader-writer 103. The definition book 3301 continues from the data rows shown in FIG. 33a to the data rows shown on the left of FIG. 33b and further continues to the data rows shown on the right of the figure. Here, the description is made using ASN.1 (Abstract Sytax Notation One) of a language for defining the standard. Further, in C language, definition of data type with typedef keyword is also possible.

The relationship between the definition book and implementation in the embodiment, namely, what command/response the defined data type is reflected on is added to comments in the definition book 3301. Here, transmission and reception of APDU are described, but transmission and reception of data based on HTTP (HyperText Transfer Protocol) may be executed.

Thus, the data type definition in the reader-writer 103 and the structure of data exchanged by the application installed in the IC card (client application 307, server application 401) and the reader-writer 103 can be implemented in various forms. Hereinafter, similar description in embodiments 2 to 7 will be skipped.

(Execution Operation STEP 1 (S1001))

It is assumed that the client application 307 in the secure device 101 is already started (not shown).

Processing corresponding to command 1 transmitted from the reader-writer 103 is executed by the application execution section 206 of the secure device 101.

Command 1 can exist in various formats for each of the functions provided by the client application, such as a request for checking the permission condition at the video content viewing time.

After reading an instruction code meaning a method call, the application execution section 206 takes out address information immediately following the instruction code.

The application execution section 206 determines whether or not the area indicated by the address information is "area permitted for the app" and if the area is a permitted area, the application execution section calls the address.

If the area is not a permitted area, the application execution section 206 recognizes an authorization code and passes the authorization code to the authorization code management section 209 and passes the parameter used in the method to the inter-card IF execution section 208.

The authorization code management section 209 reads the index contained in the authorization code, takes out the AID of the referent application contained in the authorization code table 901, and passes the AID to the inter-card IF execution section 208.

The inter-card IF execution section 208 sets the AID of the referent application in a data part of a response 1101, sets data meaning a request for using the inter-card IF in SW of the response 1101, and transmits the response 1101 to the reader-writer 103.

(Execution Operation STEP 2 (S1002))

When the exclusive control communication section 501 of the reader-writer 103 receives the response 1101 from the secure device 101, the application control section 502 analyzes the response and recognizes that the secure device 101 wants to use the inter-card IF.

The application control section 502 processes the data received from the secure device 101 (the response from the secure device 101), transfers it as a command to the different secure device 102, processes the data received from the different secure device 102 (response from the different secure device 102), and transfers it as a command to the secure device 101 until recognizing that the response received from the secure device 101 means the inter-card IF use completion.

If the reader-writer 103 receives first a response containing a message of wanting to use the inter-card IF from the secure device 101, the reader-writer 103 processes the response from the secure device 101 to a selection command 1102 shown in FIG. 11 and transmits the command to the different secure device 102.

The server application 401 stored in the application storage section 402 of the different secure device 102 is started according to the selection command 1102.

In the description to follow, the case where the server application 401 implements Remote Method Invocation (RMI) is taken as an example.

The RMI is an art defined in Java (registered trademark) Card™ and is a mechanism for an application operating in a reader-writer to call a method of a remote object of a card.

The server application 401 implementing the RMI returns a response 1103 containing INS and object ID to the reader-writer 103 in response to the selection command 1102 from the reader-writer 103.

(Execution Operation STEP 3 (S1003))

The reader-writer 103 sets the response 1103 from the server application 401 in a data part in a share command 1104 shown in FIG. 11(*a*) and transmits the share command 1104 to the inter-card IF execution section 208 of the secure device 101.

The share command 1104 is a command specialized to a command transmitted from the reader-writer 103 to the secure device 101 when the secure device 101 wants to use the inter-card IF; it is desirable that a unique INS should be assigned.

The inter-card IF execution section 208 of the secure device 101 sets request data containing the INS and the object ID passed from the server application 401, the method ID stored in the authorization code table 901, and the parameter passed from the application execution section 206 of the secure device 101 in a data part of a response 1105 shown in FIG. 11 (*b*), sets a request for using the inter-card IF in SW of the response 1105, and returns the response 1105 to the reader-writer 103.

(Execution Operation STEP 4 (S1004))

The reader-writer 103 interprets the request for using the inter-card IF and transmits an INVOKE command created based on the data stored in the data part of a response 1105 to the server application 401.

The server application 401 uses the method ID and the parameter to perform processing, and returns a response 1107 to the reader-writer 103.

(Execution Operation STEP 5 (S1005))

The reader-writer 103 sets the INVOKE command processing result of the server application (for example, only SW shown in the response 1107) in a data part of a share command 1108 shown in FIG. 11 (*b*) and transmits the share command 1108 to the inter-card IF execution section 208 of the secure device 101.

The inter-card IF execution section 208 passes the INVOKE command processing result of the server application to the application execution section 206.

After this, the application execution section 206 continues processing for the INVOKE command processing result of the server application and transmits a response 1109 to command 1 to the reader-writer 103.

The response 1109 to command 1 contains 9000h meaning success and does not contain SW containing a message of wanting to use the inter-card IF.

Therefore, the reader-writer 103 recognizes meaning of the inter-card IF use completion and stops: the later transferring between the secure device 101 and the secure device 102.

Alternatively, SW explicitly meaning the inter-card IF use completion may be transmitted from the secure device 101.

As described above, the embodiment makes it possible not only to access the server application installed in the secure device, but also to access the server application installed in the different secure device.

Accordingly, it is not necessary to install the application for common use for each possessed secure device and this merit is effective for a secure device poor in memory resources.

That is, a user merit that a different application can be installed in a second card and the later in place of the server application occurs.

Further, the source code of a client application becomes the same in use of a server application installed in the same secure device and in use of a server application installed in a different secure device.

Accordingly, when generally the convenience of users improves and the use scene is enlarged, the burden on the developer also tends to enlarge; on the other hand, the application developer can develop as before without receiving the effect of enlarging the user use scene in the system.

Download and execution of an already developed application are not affected (backward compatibility is ensured).

Thus, transition from the former secure device to the secure device proposed in the embodiment is facilitated.

Embodiment 2

In embodiment 2 of the invention, security providing when a secure device and a different secure device operate in conjunction with each other will be discussed.

Embodiment 2 will be discussed with FIGS. 12 to 14.

Figure 12:
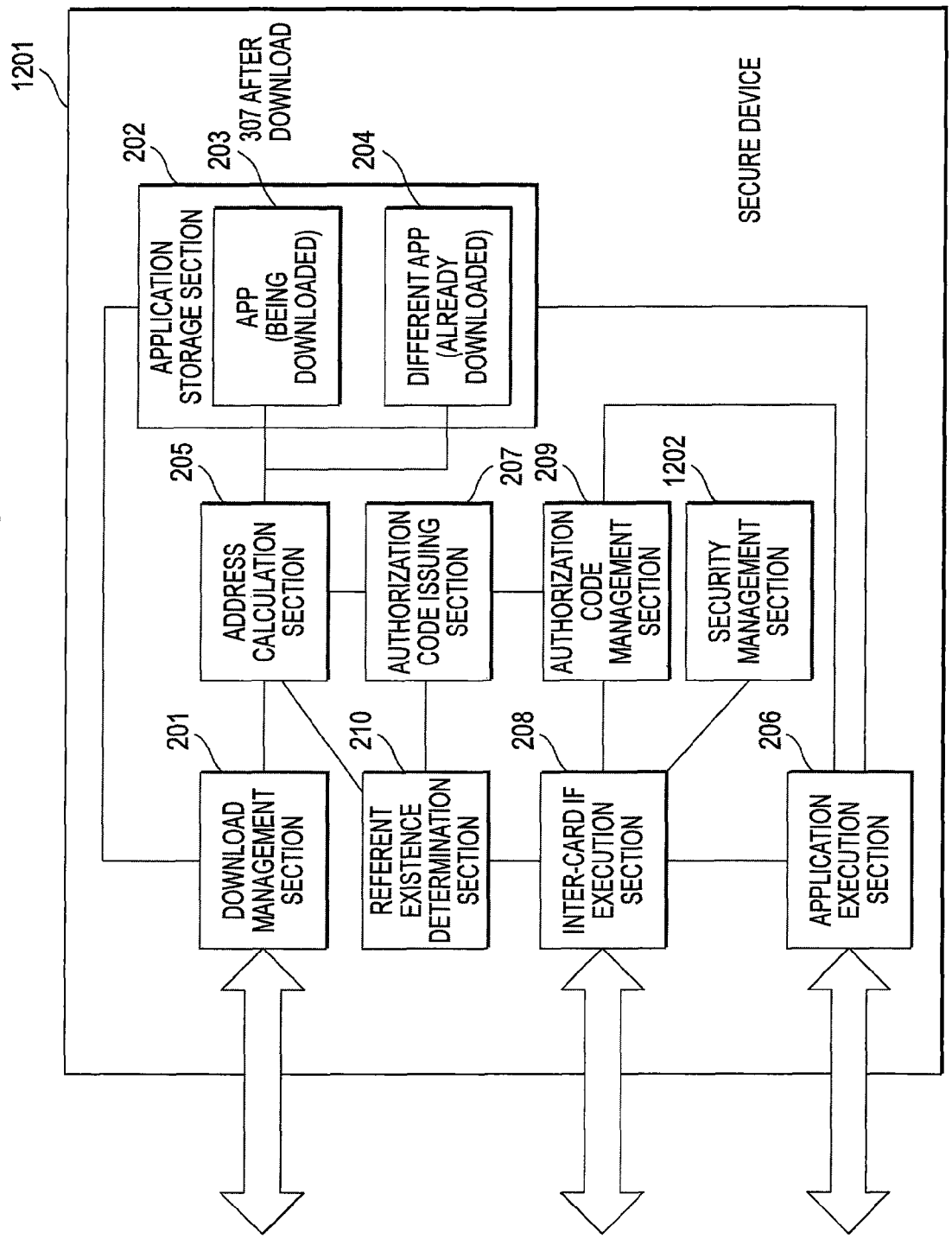
FIG. 12 is a block diagram of a secure device in embodiment 2 of the invention.

FIG. 12 is a block diagram to show the configuration of a secure device 1201 in the embodiment.

A download management section 201, an application storage section 202, an application being downloaded 203 (client application 307 after downloaded), an already downloaded application 204, an address calculation section 205, an application execution section 206, an authorization code issuing section 207, an inter-card IF execution section 208, an authorization code management section 209, and a referent existence determination section 201 in FIG. 12 are similar to those in FIG. 2.

Components identical with those of the secure device 101 in FIG. 2 are denoted by the same reference numerals.

A detailed description is given below centering on a security management section 1202, a point of difference between the secure device 101 in FIG. 2 described in embodiment 1 and the secure device 1201 in FIG. 12 described in embodiment 2:

The security management section 1202 "provides security" at a stage of issuing an authorization code described in embodiment 1 and at a stage of referring to a different secure device during application execution.

The expression "provides security" is used to mean execution of external authentication for the device (secure device) to authenticate the communicating party (different secure device), internal authentication for the communicating party to authenticate the device (hereinafter, the external authentication and the internal authentication will be collectively referred to as mutual authentication), concealment and tampering detection of communicated data, etc., and cryptographic technology is used to realize them.

In the embodiment, the "security providing" mentioned above will be discussed using public key cryptography on the precondition that "there is a possibility that a server application may be used from an indefinite number of client applications not previously registered for using the server application."

The public key cryptography generally is inferior to common key cryptography in point of processing speed.

Therefore, external authentication and internal authentication are conducted and a session key (or seed of session key) is shared using the public key cryptography, and encryption and decryption and tampering detection of communication data are executed according to the common key cryptography using the session key.

To apply the open key and session key encryption technology mentioned above to the embodiment, the following three "security providing" methods are possible:

Method 1: External-authentication and internal authentication are conducted and a session key is shared at the stage of issuing an authorization code and when a different secure device is referred to during application execution, the session key is used.

Method 2: External authentication and internal authentication are conducted and the seed of a session key is shared at the stage of issuing an authorization code and a secure device and a different secure device create a session key from the seed of the session key according to the same algorithm during application execution and the session key is used.

Method 3: External authentication and internal authentication are conducted and a session key is shared at the stage of issuing an authorization code and at the stage of referring to a different secure device during application execution.

The methods slightly differ in the processing timing and communicated data, but are the same in basic concept.

Therefore, in the embodiment, method 1 of the three methods mentioned above will be discussed by way of example.

Figure 13:
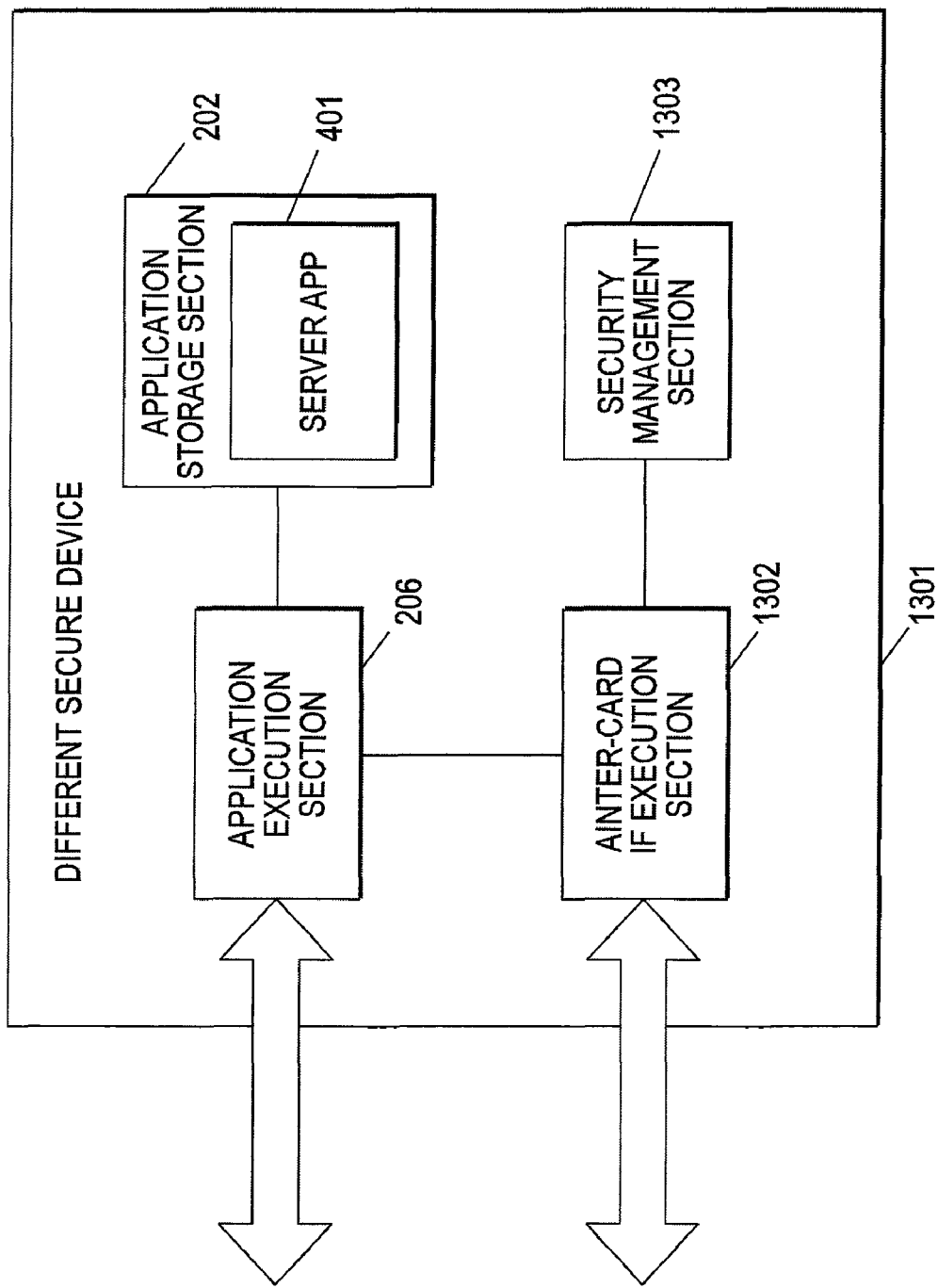
FIG. 13 is a block diagram of a different secure device in embodiment 2.

FIG. 13 is a block diagram to show the configuration of a different secure device 1301 in the embodiment.

An application execution section 206, an application storage section 202, and a server application 401 in FIG. 13 are similar to those in FIG. 4.

The different secure device differs from the different secure device 102 in FIG. 4 in an inter-card IF execution section 1302 and a security management section 1303.

The inter-card IF execution section 1302 executes communications at a stage of issuing an authorization code by the secure device 1301 and at a stage of referring to a different secure device during application execution.

The security management section 1303 has a function similar to that of the security management section 1202 and provides security.

The operation of the secure device 1201 and the different secure device 1301 having the configurations described above will be discussed.

To begin with, the stage of issuing an authorization code will be discussed.

To execute address resolution of a function call of the different application as at (STEP 2) described in embodiment 1, the address calculation section 205 of the secure device 1201 recognizes that no referent exists in the card.

Next, the address calculation section 205 requests a referent existence determination section 210 to check "whether or not the corresponding referent exists in the different secure device 102."

Figure 29:
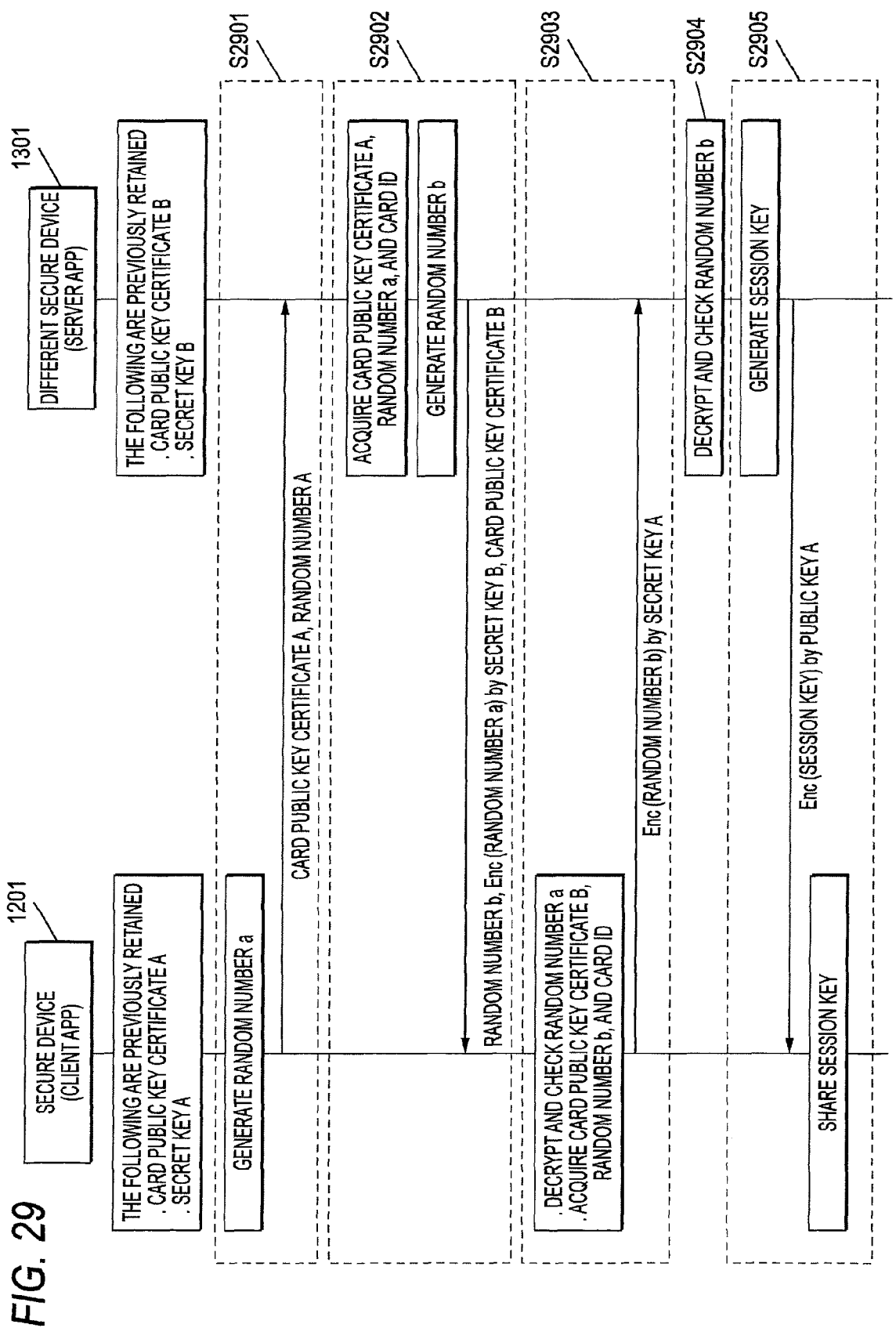
FIG. 29 is a flowchart of providing security in embodiment 2.
Figure 30:
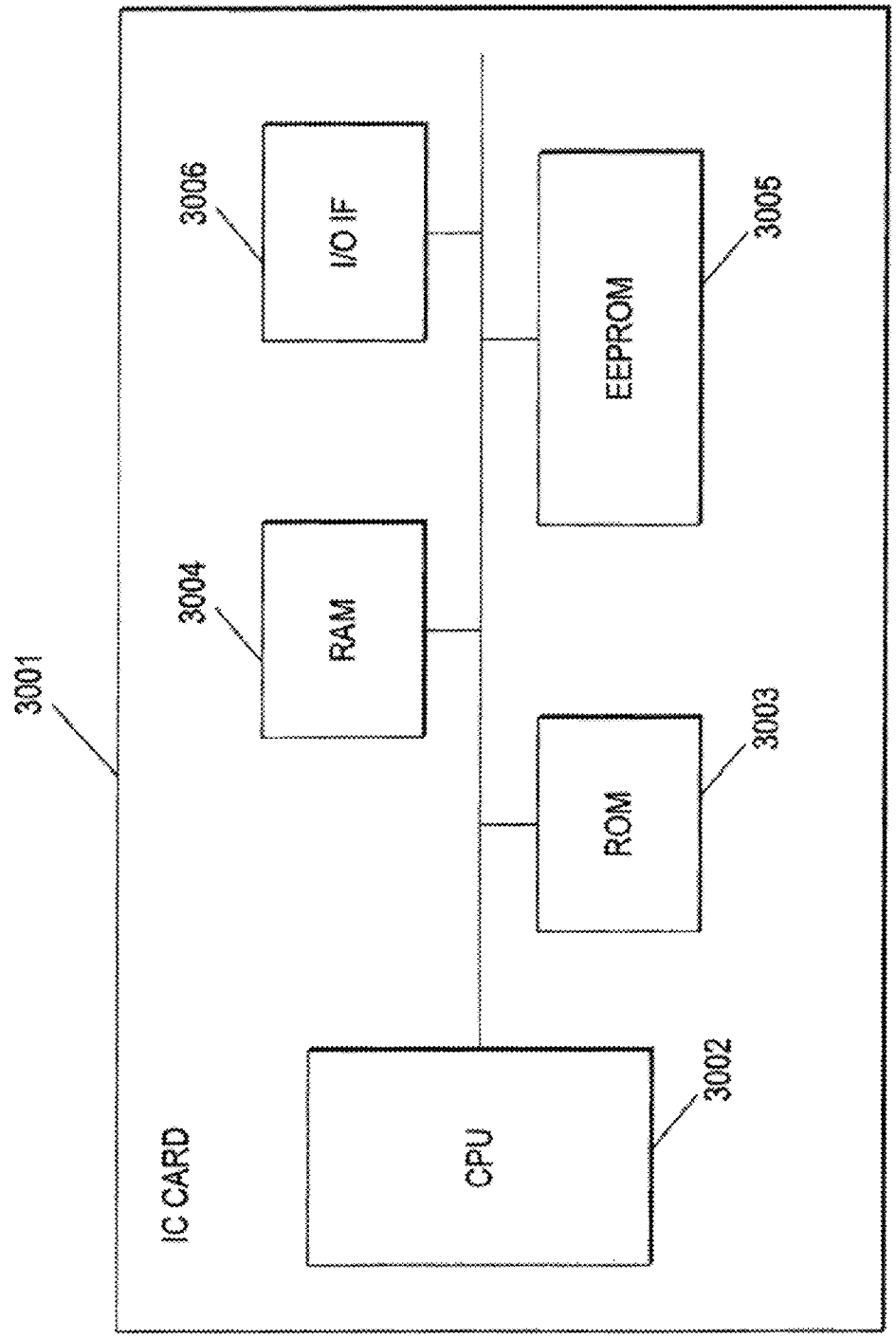
FIG. 30 is a functional block diagram concerning the hardware of an IC card.
Figure 31:
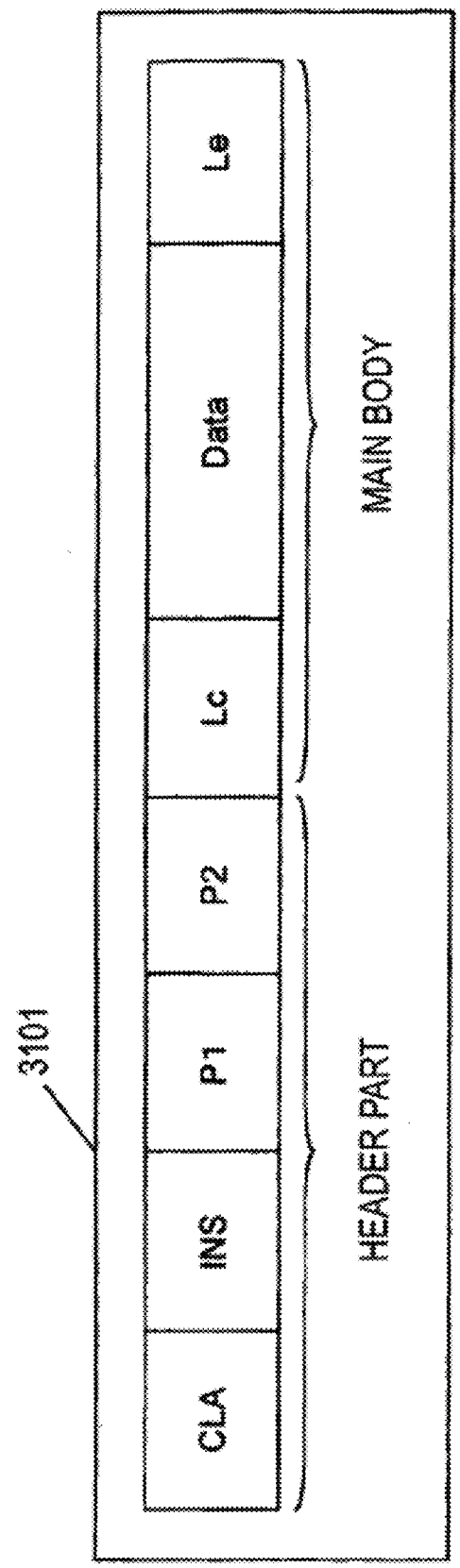
FIG. 31 is a format drawing of an APDU command.
Figure 32:
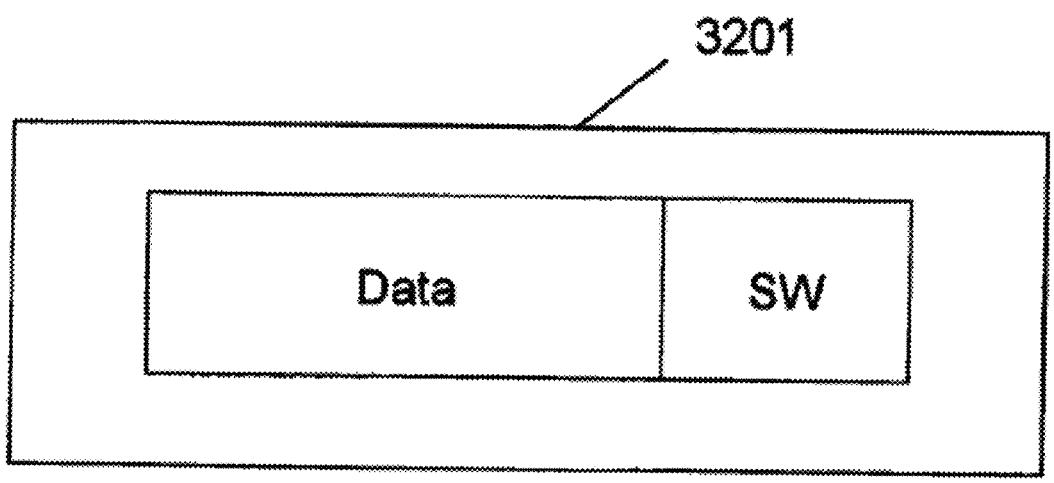
FIG. 32 is a format drawing of an APDU response.

The following operation flow is shown in FIG. 29:

(Security Providing Step 1 (S2901))

Upon reception of the request from the referent existence determination section 210, the inter-card IF execution section 208 of the secure device 1201 acquires a card public key certificate A of the secure device 1201 that the security management section 1202 has and a random number a generated by the security management section 1202.

The inter-card IF execution section 208 of the secure device 1201 transmits the card public key certificate A and the random number a to the inter-card IF execution section 1302 of the different secure device 1301.

(Security Providing Step 2 (S2902))

The inter-card IF execution section 1302 of the different secure device 1301 passes the card public key certificate A and the random number a to the security management section 1303, which then executes certificate verification and acquires the card ID and card public key A of the secure device 1201.

Next, the security management section 1303 of the different secure device 1301 generates a random number b and encrypts the random number a according to a card secret key B.

Subsequently, the encrypted random number a and a card public key certificate B of the secure device 1301 are passed to the inter-card IF execution section 1302.

The inter-card IF execution section 1302 of the different secure device 1301 transmits the random number b, the encrypted random number a, and the card public key certificate B of the secure device 1301 to the inter-card IF execution section 208.

(Security Providing Step 3 (S2903))

The inter-card IF execution section 208 of the secure device 1201 passes the random number b, the encrypted random number a, and the card public key certificate B of the secure device 1301 to the security management section 1202, which then executes certificate verification and acquires the card ID and card public key B of the different secure device 1301.

Next, the security management section 1202 decrypts the encrypted random number a according to the card public key B and checks whether or not the random number matches the generated random number a (external authentication is complete).

Subsequently, the security management section 1202 encrypts the random number b according to a card secret key A and passes it to the inter-card IF execution section 208.

The inter-card IF execution section 208 transmits the encrypted random number b to the inter-card IF execution section 1302 of the different secure device 1301.

(Security Providing Step 4 (S2904))

The inter-card IF execution section 1302 of the different secure device 1301 passes the encrypted random number b to the security management section 1303, which then decrypts the encrypted random number b according to the card secret key B and checks whether or not the random number matches the generated random number b (internal authentication is complete).

(Security Providing Step 5 (S2905))

Next, the security management section 1303 of the different secure device 1301 creates a session key, encrypts the session key according to the card public key A, and passes the encrypted session key to the inter-card IF execution section 1302.

The inter-card IF execution section 1302 transmits the encrypted session key to the inter-card IF execution section 208 of the secure device 1201.

The inter-card IF execution section 208 passes the encrypted session key to the security management section 1202, which then decrypts the encrypted session key according to the card secret key A and acquires the session key (sharing the session key is complete).

At this stage, of the data newly retained by the exchange and generation in the steps described above, the security management section 1202 needs to retain at least the session key and the security management section 1303 needs to retain at least the card ID of the secure device 1201 and the session key.

After completion of security providing step 5 described above, existence check information containing the identifier of the referent application, the method ID, the number of arguments, etc., is passed from the referent existence determination section 210 to the inter-card IF execution section 208 of the secure device 1201, which then transfers the existence check information to the different secure device 1301 through the reader-writer 103.

At this time, the security management section 1202 of the secure device 1201 encrypts transmission data using the session key and gives tampering detection data.

The different secure device 1301 checks that the function indicated in the existence check information exists, and then transfers information meaning use permission to the secure device 1201.

Also in this case, the security management section 1303 of the different secure device 1301 encrypts transmission data using the session key and gives tampering detection data.

The information received by the inter-card IF execution section 208 of the secure device 1201 is subjected to decryption using the session key and tampering check in the security management section 1202 and then is passed to the referent existence determination section 210.

If use is permitted, the referent existence determination section 210 requests the authorization code issuing section 207 to issue an authorization code.

If the use is refused, an error is issued and SW meaning that "download resulted in failure because no referent exists" is returned to the reader-writer 103 through the download management section 201.

Next, execution of the client application given an authorization code will be discussed. Basically, it is similar to that in embodiment 1 and the differences therebetween are as follows:

First, the responses from the secure device 1201 and the different secure device 1301 are encrypted using the session key managed by the security management sections 1202 and 1303.

Second, the responses from the secure device 1201 and the different secure device 1301 are encrypted and thus it is impossible for the reader-writer 103 to interpret, extract necessary data, and create a command.

Therefore, the reader-writer 103 needs to extract necessary data from the data part of the response, build the data in a command, and transmit the command to the secure device 1201, the different secure device 1301.

Next, an operation flow during client application execution by the secure device 1201, the different secure device 1301, and the reader-writer 103 will be discussed with FIG. 10.

In the description to follow, it is assumed that the secure device 101 in FIG. 10 is applied intact as the secure device 1201 and the different secure device 102 is applied intact as the different secure device 1301.

It is also assumed that the client application 307 in the secure device 1201 is already started.

(Execution Operation STEP 1 (S1001))

Processing corresponding to command 1 transmitted from the reader-writer 103 is executed by the application execution section 206 of the secure device 1201.

After reading an instruction code meaning a method call, the application execution section 206 takes out address information immediately following the instruction code.

Whether or not the address information is an area permitted for the application is determined and if the area is a permitted area, the address is called.

If the area is "not" a permitted area, an authorization code is recognized and the authorization code is passed to the authorization code management section 209.

The authorization code management section 209 reads the index contained in the authorization code, takes out the AID of the referent application contained in a table 901, and passes the AID of the reference application to the inter-card IF execution section 208.

The inter-card IF execution section 208 sets the AID of the referent application in a data part of a response, sets data meaning a request for using the inter-card IF in SW of the response, and transmits the response to the reader-writer 103.

(Execution Operation STEP 2 (S1002))

When an exclusive control communication section 501 of the reader-writer 103 receives the response, an application control section 502 analyzes the response and recognizes that the secure device 1201 wants to use the inter-card IF.

The application control section 502 processes the data received from the secure device 1201 (the response from the secure device 1201), transfers it as a command to the different secure device 1301 to the different secure device 1301, processes the data received from the different secure device 1301 (response from the different secure device 1301), and transfers it as a command to the secure device 1201 to the secure device 1201 until recognizing that the data received from the secure device 1201 means the inter-card IF use completion.

If the reader-writer 103 receives first a response containing a message of wanting to use the inter-card IF from the secure device 1201, the reader-writer 103 processes the response to a selection command and transmits the command to the different secure device 1301.

The server application 401 of the different secure device 1301 is started according to the selection command.

In the description to follow, the case where the server application 401 implements Remote-Method Invocation (RMI) is taken as an example.

The server application 401 implementing the RMI returns a response containing INS and object ID to the reader-writer 103 as a response to the selection command.

(Execution Operation STEP 3 (S1003))

The reader-writer 103 sets the response from the server application 401 in a data part of a share command and transmits the share command to the inter-card IF execution section 208 of the secure device 1201.

The inter-card IF execution section 208 retains the INS and the object ID passed from the server application 401.

Although a method of retaining the INS and the object ID is not shown in the figure, memory can be provided in the secure device 1201 for retaining them.

After this, the responses from the secure device 1201 and the different secure device 1301 are encrypted using the session key in the security management sections 1202 and 1303.

The data received from the associated party is decrypted using the session key in the security management sections 1202 and 1303 and then processing is performed in the card IF execution sections 208 and 1302.

Figure 14:
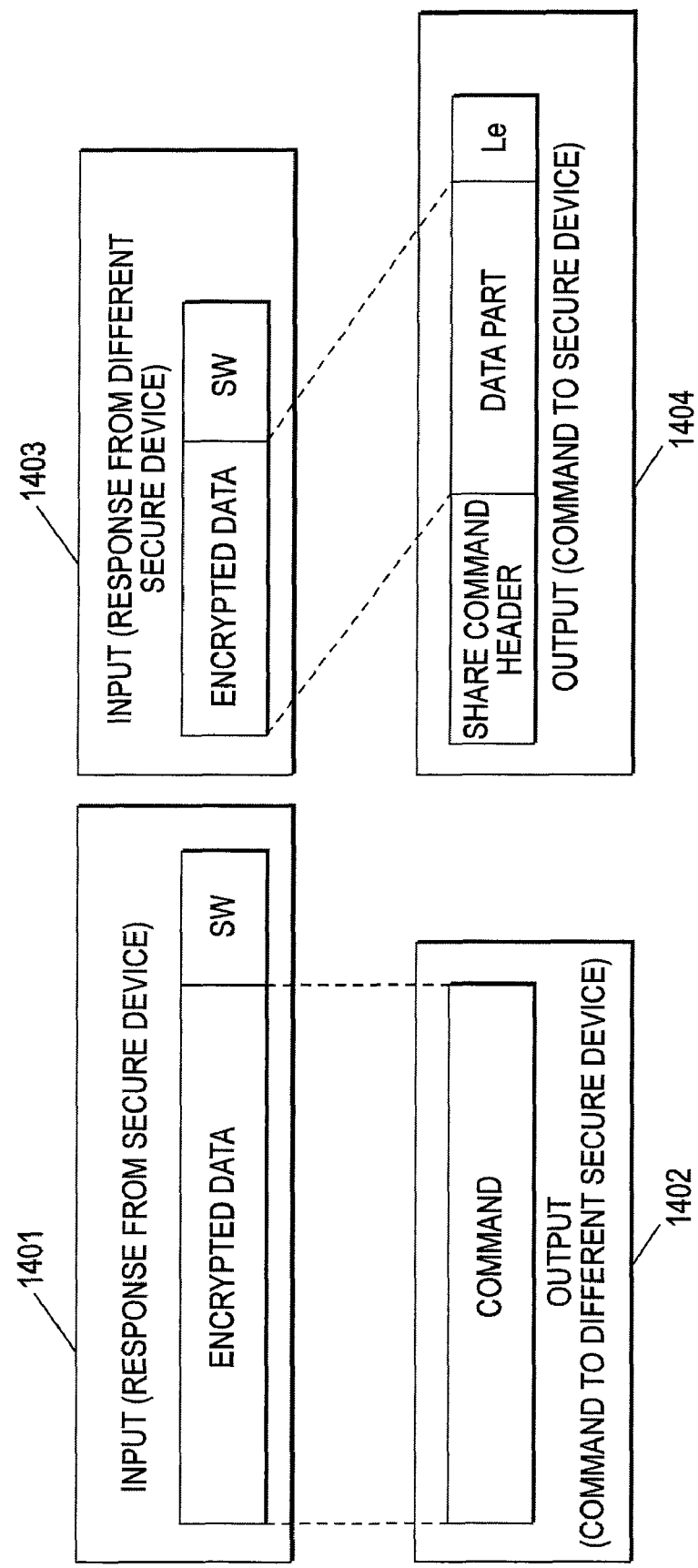
FIG. 14 is a drawing to show the relationship between input and output to and from a reader-writer.

FIG. 14 shows the relationship between input and output to and from the reader-writer 103.

The reader-writer 103 transmits a data part of a response 1401 from the secure device 1201 to the different secure device 1301 as a command 1402.

A response 1403 from the different secure device 1301 is set in a data part of a command 1404 and a header for a share command is added for transmission to the secure device 1201.

The inter-card IF execution section 208 of the secure device 1201 sets request data containing the INS and the object ID passed from the server application 401 of the different secure device 1301, the method ID specified by the application execution section 206 of the secure device 1201, and the parameter passed from the application execution section in a data part of a response, sets a request for using the inter-card IF in SW, and returns to the reader-writer 103.

(Execution Operation STEP 4 (S1004))

The reader-writer 103 interprets the request for using the inter-card IF from the secure device 1201, extracts the data stored in the data part of the response (already encrypted INVOKE command), and transmits the data to the server application 401 of the different secure device 1301 as a command.

The server application 401 uses the method ID and the parameter specified in the INVOKE command to perform processing, and returns the processing result to the reader-writer 103.

(Execution Operation STEP 5 (S1005))

The reader-writer 103 transmits a share command with the processing result set in a data part to the inter-card IF execution section 208 of the secure device 1201.

The inter-card IF execution section 208 passes the result to the application execution section 206.

After this, the application execution section 206 continues processing for the result and transmits a response to command 1 to the reader-writer 103.

The response to command 1 generally does not contain SW containing a message of wanting to use the inter-card IF.

Therefore, the reader-writer 103 recognizes meaning of the inter-card IF use completion and stops the later transferring between the secure device 1201 and the secure device 1301.

Alternatively, SW explicitly meaning the inter-card IF use completion may be transmitted from the secure device 1201.

In embodiment 2, the system for providing security in existence check of the referent and reference to the different secure device during application execution by the security management sections 1202 and 1303 has been described.

The configuration described above makes it possible to prevent spoofing of the secure device, prevent tapping of the data exchanged between the secure devices, and detect tampering of the data.

Embodiment 3

In embodiment 3 of the invention, a system (No. 1) for checking that the owner of a secure device and the owner of a different secure device match will be discussed.

Embodiment 3 will be discussed with FIGS. 12, 13, 15, and 16.

FIG. 12 is a block diagram to show the configuration of a secure device 1201 in the embodiment and is similar to that described in embodiment 2.

FIG. 13 is a block diagram to show the configuration of a different secure device 1301 in the embodiment and is similar to that described in embodiment 2.

Figure 15:
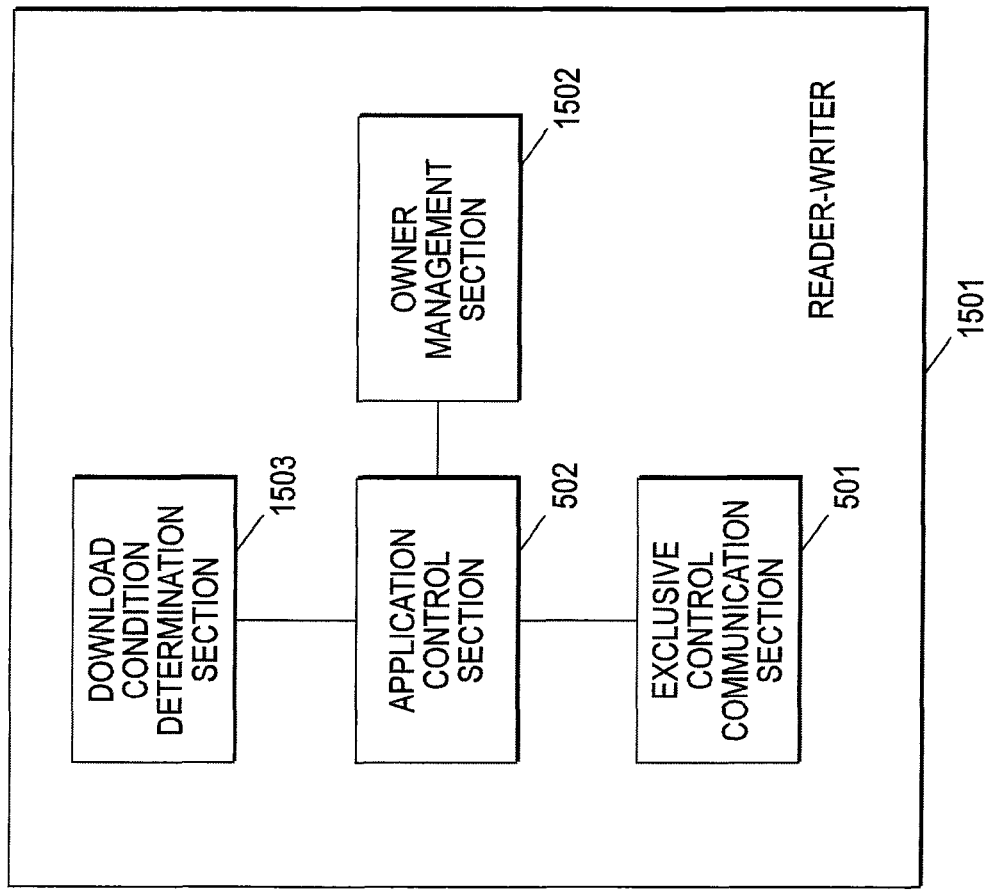
FIG. 15 is a block diagram of a reader-writer in embodiment 3 of the invention.

FIG. 15 is a block diagram to show the configuration of a reader-writer 1501 in the embodiment.

An exclusive control section 501 and an application control section 502 in FIG. 15 are similar to the exclusive control section 501 and the application control section 502 in FIG. 5.

The embodiment is characterized by the reader-writer and differs from embodiment 1 and embodiment 2 described above in that it has an owner management section 1502 and a download condition determination section 1503.

The owner management section 1502 manages the owner of the secure device 1201 and the card ID set in the secure device 1201.

The download condition determination section 1503 manages download condition information defining the condition in downloading a client application.

If the user wants to download a client application, the reader-writer 1501 passes the corresponding download condition information to the application control section 502, which then executes processing to check whether or not the download condition is satisfied.

In the embodiment, the system made up of the secure device 1201, the different secure device 1301, and the reader-writer 1501 will be discussed below:

In embodiments 1 and 2 described above, when a client application executes address resolution, if a server application does not exist in the same secure device, the method of using the server application existing in a different secure device was described.

At the time, the sameness of the "client application owner (=owner of secure device)" using the client application to enjoy service and the "server application owner (=owner of different secure device)" using the server application to enjoy service, etc., is not considered.

In the embodiment, if some relationship is required for the client application owner and the server application owner, a method of checking and ensuring the required relationship is mentioned.

For example, it is assumed that the server application is a credit application and the client application is a content purchase application.

In this case, the credit card trade needs to correctly keep track of "how much who purchased what content" and thus a situation can occur wherein it is desirable that the owner of the client application and the owner of the server application should be the same person.

In the embodiment, such a situation is assumed and a method of checking the sameness of the server application owner and the client application owner when the client application executes address resolution will be discussed.

The following two patterns are considered as the method of ensuring the sameness of the server application owner and the client application owner:

(1) The sameness is checked in the reader-writer and then the client application is downloaded in the secure device.

(2) Personal authentication (example: PIN check) is executed for each secure device at the stage of downloading, whereby the sameness is checked.

In embodiment 3, (1) mentioned above will be discussed.

(2) mentioned above will be discussed in embodiment 4.

To describe (1) mentioned above, the following are preconditions: ("Start" in FIG. 16)

The reader-writer 1501 is in a state in which it can communicate with the different secure device 1301 to which a server application has been downloaded and the secure device 1201 to which a client application is to be downloaded.

The condition of downloading the client application is defined as that "the different secure device can be referred to, in which case the server application owner and the client application owner are the same."

The reader-writer 1501 already grasps nonexistence of the server application in the secure device 1201.

The preconditions can be realized using general techniques and are not shown in the figure. The operation of the system concerning (1) mentioned above will be discussed with a flowchart of FIG. 16.

Figure 16:
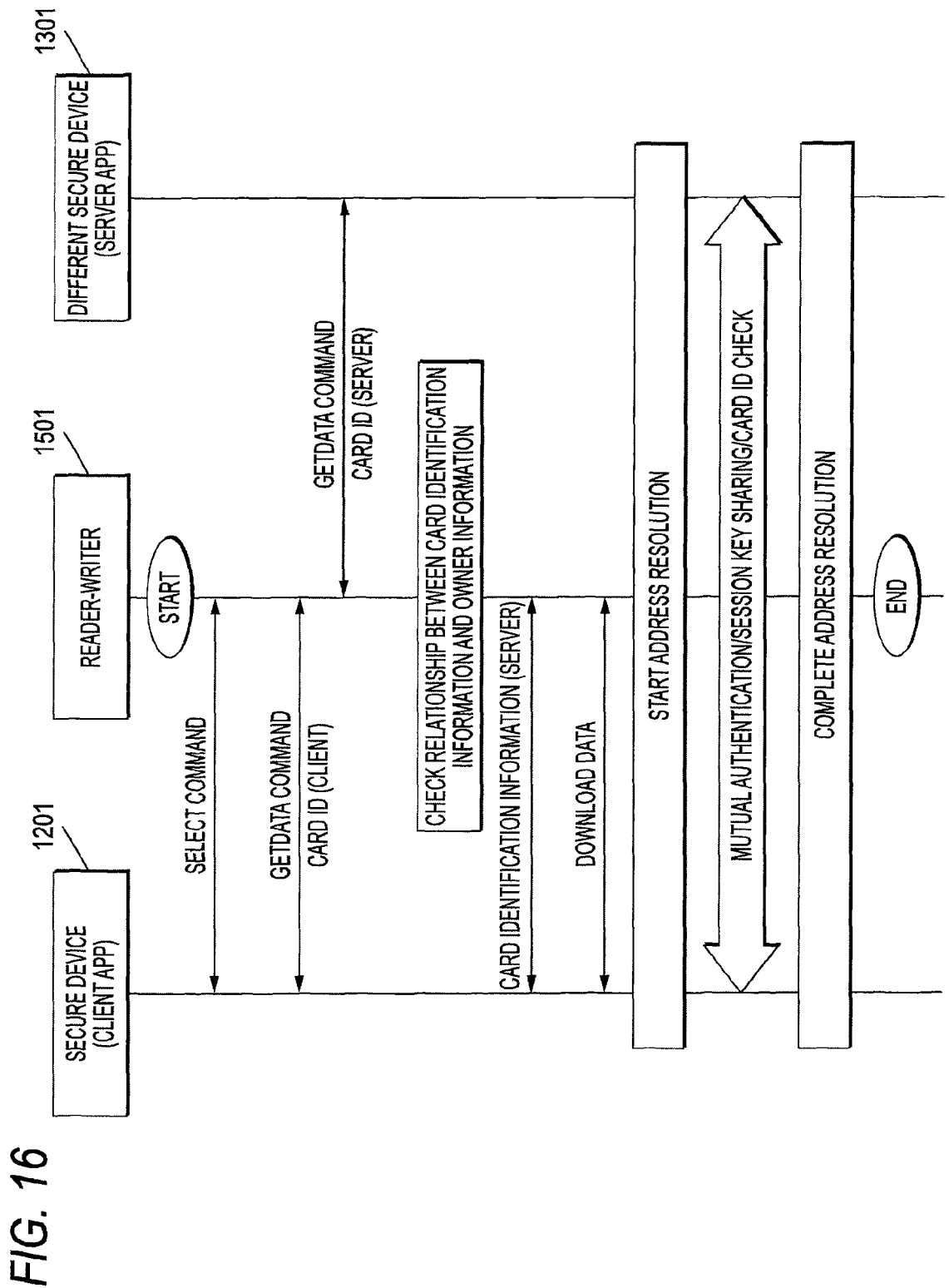
FIG. 16 is a flowchart of processing in embodiment 3.

To begin with, as shown in FIG. 16, the reader-writer 1501 transmits a SELECT command to the different secure device 1301 and checks whether or not the server application exists in the different secure device.

Next, the card ID given to the different secure device 1301 is acquired according to a GETDATA command.

The "card ID" is information for uniquely identifying the secure device; for example, it is made up of Issuer Identification Number unique for the card issuer and Card Identification Number for uniquely identifying the card issued by the card issuer.

Likewise, the reader-writer 1501 also acquires the card ID from the secure device 1201.

The application control section 502 of the reader-writer 1501 requests the owner management section 1502 to check that the owners of the secure devices associated according to the card IDs of the secure device 1201 and the different secure device 1301 acquired as described above match.

As a result of the determination of the owner management section 1502 as to whether or not the owner of the secure device 1201 and the owner of the different secure device 1301 match, if the owners of both the secure devices match, the reader-writer 1501 starts to download the client application.

Here, the reader-writer 1501 needs to transmit the card ID of the different secure device 1301 to the secure device 1201 at least before an address calculation section 205 of the secure device 1201 executes address resolution.

The secure device 1201 stores the card ID in an authorization code management section 209.

When the secure device 1201 executes address resolution, it recognizes that the server application does not exist in the secure device 1201 of the home secure device and checks whether or not the server application exists in the different secure device 1301.

Here, security providing steps 1 to 5 described in embodiment 2 are executed in a similar manner.

However, during execution of the steps, it is necessary to check whether or not the card ID acquired from the card public key certificate of the different secure device 1301 and the card ID stored in the authorization code management section 209 match.

This can also be skipped because the match of the card ID and the owner is already checked in the reader-writer 1501.

However, the security level improves by again checking during the address resolution in addition to the previous checking against a threat of substituting a fraudulent one for the different secure device 1301 after the card ID is transmitted.

In embodiment 3, the method of ensuring the sameness of the server application owner and the client application owner if the server application and the client application are installed in different secure devices has been described.

The sameness is checked, whereby downloading of a client application by spoofing can be prevented.

The technique can be applied not only to checking the sameness of the owner, but also to checking whether or not the client application owner is a family of the server application owner, belongs to the same group, etc.

As described above, the system capable of flexibly setting and checking the relationship between the server application owner and the client application owner can be provided.

Embodiment 4

In embodiment 4 of the invention, a system (No. 2) for checking that the owner of a secure device and the owner of a different secure device match will be discussed.

Embodiment 4 will be discussed with FIGS. 12, 13, 17, and 18.

FIG. 12 is a block diagram to show the configuration of a secure device 1201 in the embodiment and is similar to that described in embodiment 2.

FIG. 13 is a block diagram to show the configuration of a different secure device 1301 in the embodiment and is similar to that described in embodiment 2.

Figure 17:
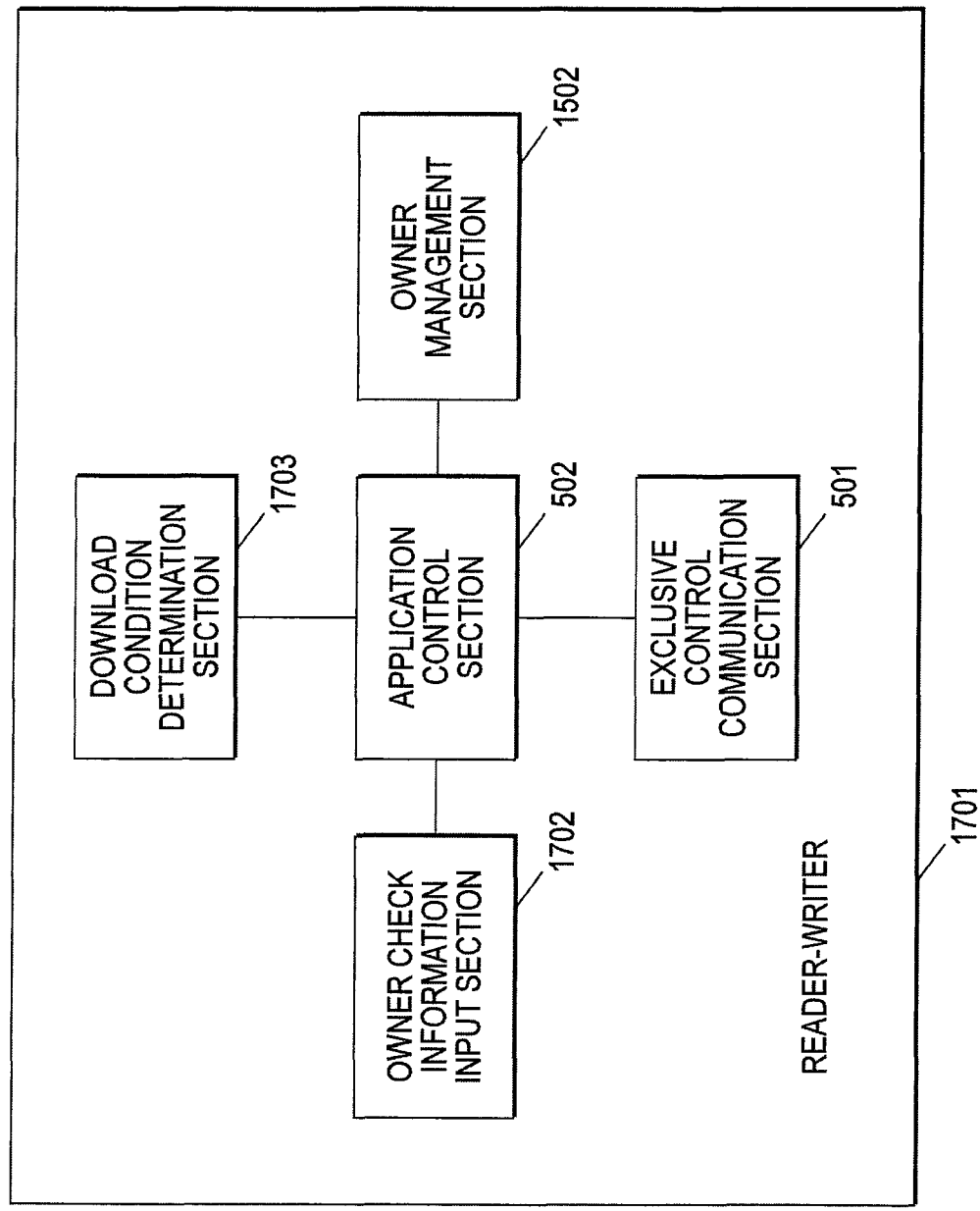
FIG. 17 is a block diagram of a reader-writer in embodiment 4 of the invention.

FIG. 17 is a block diagram to show the configuration of a reader-writer 1701 in the embodiment.

An exclusive control section 501 and an application control section 502 in FIG. 17 are similar to the exclusive control section 501 and the application control section 502 in FIG. 5.

An owner management section 1502 is similar to the owner management section 1502 in FIG. 15.

The embodiment differs from embodiment 3 in that it has an owner information check input section 1702.

The owner information check input section 1702 is provided for entering information to determine the validity of a secure device owner (example: PIN).

An input screen is possible as an example of the owner information check input section 1702.

However, the screen is displayed only when the application control section 502 interprets a response as a request for providing a PIN input screen after the response is returned from the secure device 1201 and requests the owner information check input section 1702 to output the screen.

In the embodiment, the system made up of the secure device 1201, the different secure device 1301, and the reader-writer 1501 will be discussed below:

In embodiments 1 and 2, when a client application in the secure device executes address resolution, if a server application does not exist in the home secure device, the system of using the server application existing in a different secure device was described.

At the time, the sameness of the "client application owner (=owner of secure device)" using the client application to enjoy service and the "server application owner (=owner of different secure device)" using the server application to enjoy service, etc., is not considered.

In the embodiment, if some relationship is required for the client application owner and the server application owner, a method of checking and ensuring the required relationship is mentioned as in embodiment 3 described above.

For example, it is assumed that the server application is a credit application and the client application is a content purchase application. In this case, the credit card trade needs to correctly keep track of "how much who purchased what content" and thus a situation can occur wherein it is desirable that the owner of the client application and the owner of the server application should be the same person.

Figure 18:
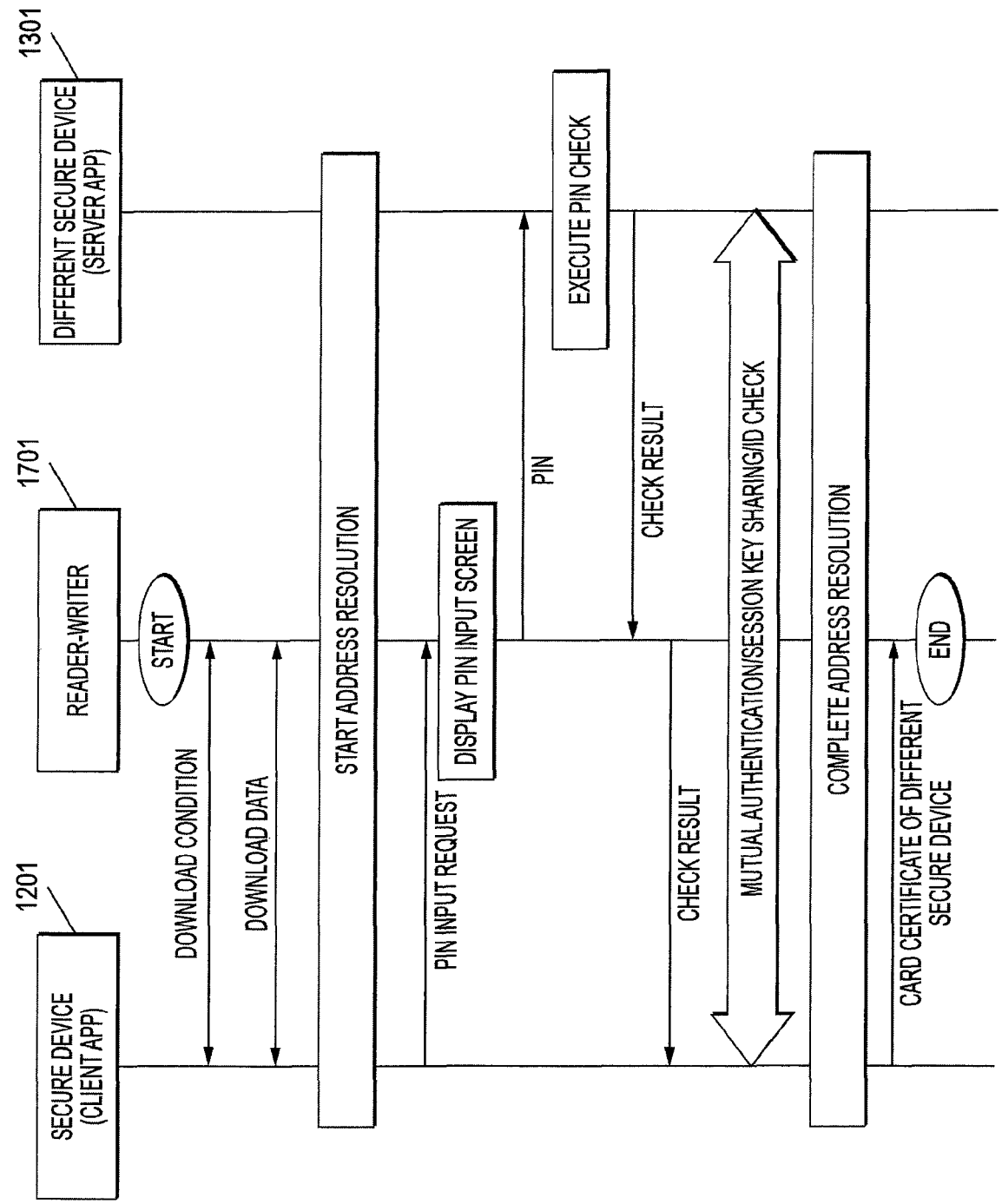
FIG. 18 is a flowchart of processing in embodiment 4.

Therefore, such a situation is assumed and in the embodiment, a method of checking the sameness of the server application owner and the client application owner when the client application executes address resolution will be discussed with FIG. 18.

To describe the invention described in the embodiment, first, preconditions are described. ("Start" in FIG. 18)

The reader-writer is in a state in which it can communicate with the different secure device to which a server application has been downloaded and the secure device to which a client application is to be downloaded.

The condition of downloading the client application is defined as that "the different secure device can be referred to, in which case the server application owner and the client application owner are the same."

The reader-writer already grasps nonexistence of the server application in the secure device.

The preconditions can be realized using general techniques and are not shown in the figure.

The operation of the system concerning the invention described in the embodiment will be discussed with a flowchart of FIG. 18.

To begin with, the reader-writer 1701 transmits the download condition to the secure device 1201.

A download management section 1201 receives the download condition and passes it to a security management section 1202, which then stores the download condition.

Next, client application downloading is started.

When the secure device 1201 executes address resolution, it recognizes that the server application does not exist in the secure device 1201 of the home secure device and checks whether or not the server application exists in the different secure device 1301.

Here, security providing steps 1 to 5 described in embodiment 2 are executed in a similar manner.

However, during execution of the steps, an inter-card IF execution section 208 of the secure device 1201 executes processing for checking whether or not the download condition stored in the download management section 1202 is satisfied in conjunction with the reader-writer 1701.

The inter-card IF execution section 208 can switch the processing for checking whether or not the condition is satisfied in response to the download condition.

If the download condition is that "the different secure device can be referred to, in which case the server application owner and the client application owner are the same" in the embodiment, a response as a request for input of PIN is transmitted to the reader-writer 1701.

The reader-writer 1701 receives the response in the exclusive control section 501 and passes the response to the application control section 502.

The application control section 502 interprets the response as a request for input of PIN, and requests the owner information check input section 1702 to display a screen.

Next, the owner enters the PIN in the screen displayed by the owner information check input section 1702.

The entered PIN is transmitted from the exclusive control section 501 to the different secure device 1301 and is received by an inter-card IF execution section 1302.

Upon reception of a request from the inter-card IF execution section 1302, a security management section 1303 executes PIC check and transmits the result via the reader-writer 1701 to the secure device 1201.

The PIN check need not necessarily be executed in the security management section 1303; for example, a component such as a PIN check section may be provided.

If the result is "OK," the inter-card IF execution section 208 of the secure device 1201 determines that the owner of the different secure device is identical with the owner of the secure device to which the application is to be downloaded, and continues the address resolution.

Although the owner of the different secure device differs from the owner of the secure device, there is a threat for PIN check of the different secure device to result in OK as the owners of the secure devices act in conjunction with each other.

Then, after completion of the downloading, a card certificate of the different secure device is transmitted from the secure device to the reader-writer, which then checks the owners for sameness. As a result, spoofing can be detected.

As described above, in embodiment 4, the method of ensuring the sameness of the server application owner and the client application owner if the server application and the client application are installed in different secure devices has been described.

The technique is optimum particularly when download is executed in an environment in isolation from an owner information database.

Embodiment 5

Embodiment 5 of the invention relates to use control of a client application in association with the life cycle of a secure device in which a server application is installed.

Embodiment 5 will be discussed with FIGS. 2, 4, 5, 19, and 20.

FIG. 2 is a block diagram to show the configuration of a secure device 101 in the embodiment and components are similar to those described in embodiment 1.

FIG. 4 is a block diagram to show the configuration of a different secure device 102 in the embodiment and components are similar to those described in embodiment 1.

FIG. 5 is a block diagram to show the configuration of a reader-writer 103 in the embodiment and components are similar to those described in embodiment 1.

FIG. 20 is an authorization code table 2001 contained in an authorization code management section 209, and the identifier of a client application is contained in addition to the index, the identifier of the referent application, the method ID, and the number of arguments in FIG. 9.

The embodiment differs from other embodiments of the invention in that the identifier of a client application is contained.

In the embodiment, the system made up of the secure device 101, the different secure device 102, and the reader-writer 103 will be discussed below:

If a server application and a client application are installed in the same secure device, the life cycles of both applications are associated with the life cycle of the secure device.

That is, if the secure device is usable, both applications are usable; if the secure device is in a temporary halt or discard state, both applications also become nonusable.

In the case where the server application and the client application are installed in separate secure devices in the embodiments described above, when the secure device is in a temporary halt or discard state, how the system operates will be discussed.

If the different secure device in which the server application is installed (hereinafter, server device) is usable and the secure device in which the client application is installed (hereinafter, client device) is nonusable, no problem arises because the client side cannot be executed.

On the other hand, if the server device is nonusable and the client device is usable, processing different from former processing is required.

That is, description of "client application cannot be used because server device temporarily halts" needs to be returned to the reader-writer.

It is desirable that the return should be made as early as possible.

Figure 19:
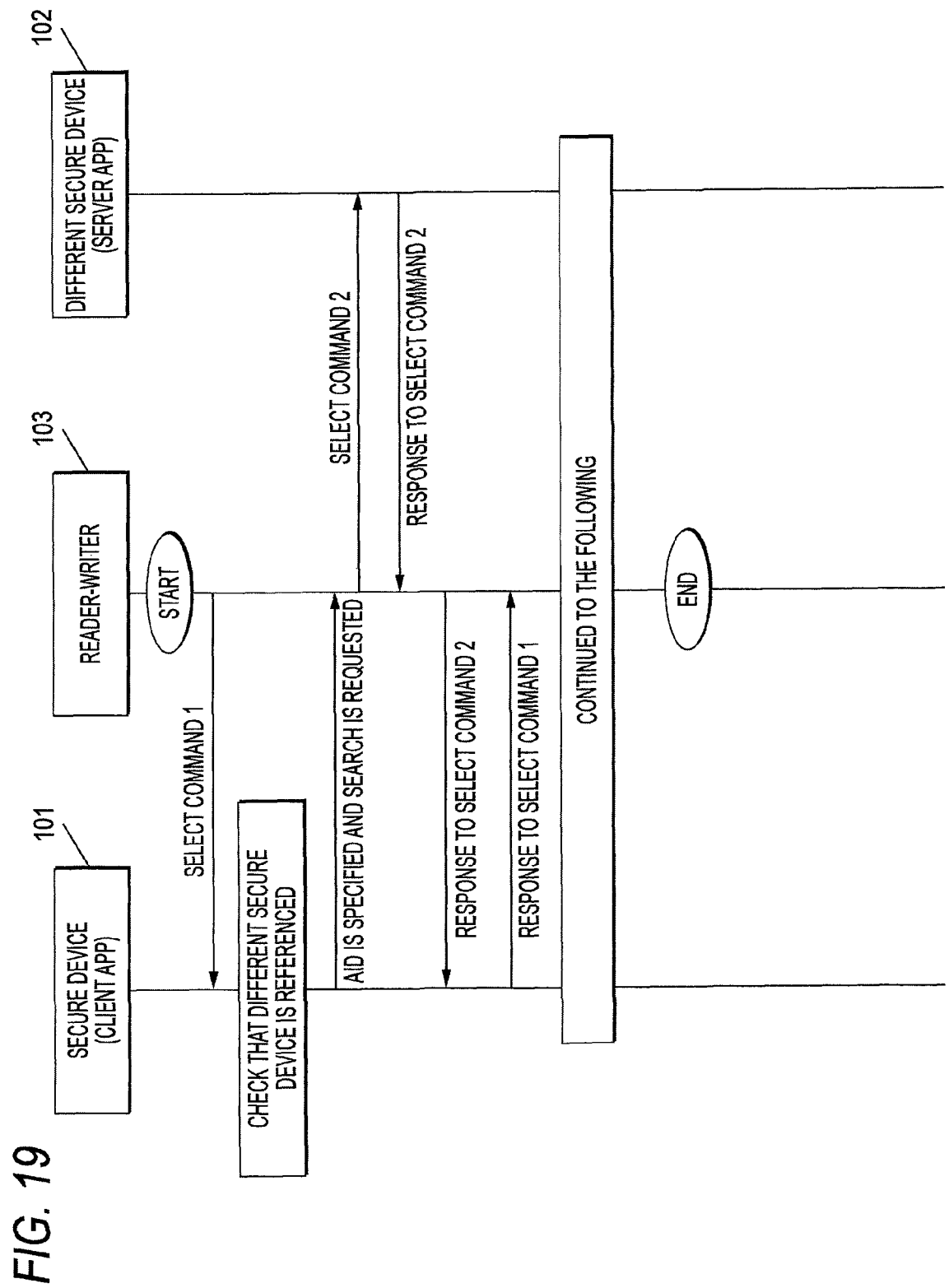
FIG. 19 is a flowchart of processing in embodiment 5 of the invention.

Therefore, in the embodiment, processing of checking the life cycle of the different secure device when the client application referring to the server application registered in the different secure device is executed will be discussed with FIG. 19.

The reader-writer 103 transmits a SELECT command for selecting a client application to the secure device 101.

An application execution section 206 of the secure device 101 receives the SELECT command and passes the AID of the client application set in a data part to an inter-card IF execution section 208.

The inter-card IF execution section 208 refers to the authorization code table 2001 stored in the authorization code management section 209.

If the AID of the corresponding client application does not exist in the authorization code table 2001, a notification indicating the fact is sent to the application execution section 206, which then executes usual SELECT command processing.

If the AID of the corresponding client application exists, the AID of the server application installed in the different secure device is extracted from the authorization code table 2001 and a response made up of the AID of the server application and data as a "request for transmitting SELECT command to different secure device" is returned to the reader-writer 103.

The reader-writer 103 creates SELECT command from the data received from the inter-card IF execution section 208 of the secure device 101 and transmits the SELECT command to the different secure device 102.

Next, a response from the different secure device 102 is passed to the secure device 101.

The inter-card IF execution section 208 of the secure device 101 analyzes the response and grasps the usable state of the different secure device 102.

If the different secure device 102 is usable, a message indicating the fact is sent to the application execution section 208, which then executes usual SELECT command processing.

If the different secure device 102 is nonusable, a message indicating the fact is sent to the application execution section 208, which then returns a response setting an SW indicating that "the client application cannot be used because the different secure device is nonusable" to the reader-writer 103.

In embodiment 5, the behavior of the secure device installing the client application when the secure device installing the serve application is in a temporary halt or discard state, that can occur if the server application and the client application are installed in different secure devices has been described.

The state of the server application is checked at the SELECTing time of the client application, so that extra processing such as recovery processing in the card and the reader-writer can be eliminated as compared with the case where the state of the server application is checked during processing execution of the client application.

Switching can also be performed so as to execute the client application only in the range in which the function of the server application is not used.

As described above, it is made possible to select processing responsive to the state of the server application in the server for executing the client application and flexible service providing can be accomplished in contrast to the related art in which both the server application and the client application are usable or nonusable.

Embodiment 6

Embodiment 6 is the invention relating to a conditional download method of a client application and a condition check method when a serve application does not exist in the same card.

For example, the embodiment can be applied to a system of permitting download of a client application provided that a server application is referred to before the client application is actually used if the user forgets to carry a secure device installing the server application.

Embodiment 6 will be discussed with FIGS. 2, 4, 5, 9, 10, 21, 22, and 23.

FIG. 2 is a block diagram to show the configuration of a secure device 101 in the embodiment and components are similar to those described in embodiment 1.

FIG. 4 is a block diagram to show the configuration of a different secure device 102 in the embodiment and components are similar to those described in embodiment 1.

FIG. 5 is a block diagram to show the configuration of a reader-writer 103 in the embodiment and components are similar to those described in embodiment 1.

FIG. 9 shows an example of an authorization code table 901 and components are similar to those described in embodiment 1.

The embodiment is characterized by the authorization code, a temporary authorization code, etc., shown in FIG. 22, FIG. 23.

FIG. 22 is an instruction defining the rules for an authorization code issuing section 207 to issue an authorization code.

FIG. 23 shows an example of a temporary authorization code management table 2301 managed by an application execution section 206. The temporary authorization code management table 2301 is made up of an index, the identifier of a client application, the identifier of a server application, and address calculation data.

In the embodiment, a system made up of the secure device 101, the different secure device 102, and the reader-writer 103 will be discussed below:

In embodiment 1, the method of issuing an authorization code if the server application installed in the different secure device can be referred to in downloading the client application using the IF of the server application was described.

In contrast, in the embodiment, issuing of various authorization codes and a method of making the most of the issued authorization code will be discussed with FIG. 21.

Previously, "application type," "temporary authorization code issuing permission," and the like are set in the authorization code issuing section 207 according to a command for setting the attributes of an application transmitted from the reader-writer 103.

The "application type" is classification of applications according to various restrictions, such as a temporary application whose number of use times, use period, etc., is limited or a formal application on which no restrictions are imposed, for example.

Thus, the "application type" is used to determine what restriction is imposed on the application.

The "temporary authorization code issuing permission" is permission of issuing a temporary authorization code without handling as a download error although there is no referent when a referent existence determination section 210 checks reference to the server application at the address resolving time, and it is necessary for the application execution section 206 to "be able to determine that the state is a state in which the referent is not yet checked" and "be able to determine how long the state will be permitted" in interpretation of the temporary authorization code.

For example, a scene is assumed where if the user does not possess the secure device installing the server application (for example, forgets to carry, etc.), temporarily the client application is downloaded and then the secure device installing the server application is checked and an authorization code is issued.

In the embodiment, the operation of the system in the assumed situation will be discussed.

Figure 21:
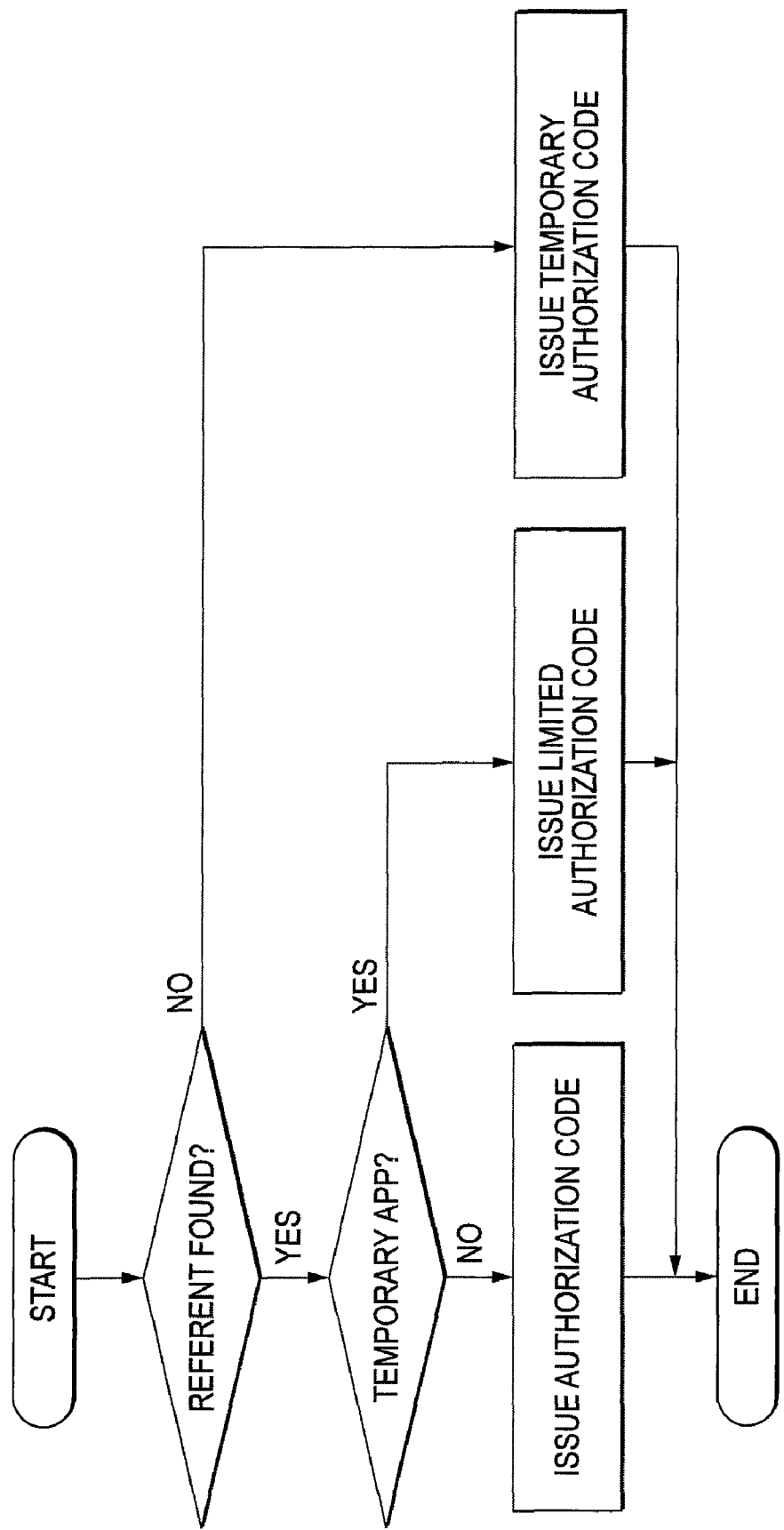
FIG. 21 is a flowchart of issuing an authorization code in embodiment 5.

In FIG. 21, the flow until "issue authorization code" is similar to that in embodiment 1 and the invention described in the embodiment is characterized by the later processing.

(Issuing of Limited Authorization Code)

Issuing of a limited authorization code will be discussed.

Previously, the "application type" is set in the referent existence determination section 201 according to a command for setting the attributes of the application transmitted from the reader-writer 103.

Here, it is assumed that the application is set as a temporary application with the upper limit of the number of use times being three.

The flow until address resolution is started at the application downloading time and the different secure device 102 transfers information meaning use permission to the secure device 101 is similar to that in embodiment 1.

The referent existence determination section 210 determines "OK" as a result of analyzing received information by an inter-card IF execution section 208 and then requests the authorization code issuing section 207 to issue a limited authorization code using the "application type."

Since the application type is a temporary application and the number of use times is three, the authorization code issuing section 207 issues FCB1h as a limited authorization code in conformance with an instruction 2201.

According to the instruction 2201, FC-FDh of information indicating the address area where placement of application is not permitted is assigned to the top one type, the following four bits represent the type and description of restriction, and the last four bits give the index of the authorization code table 901.

After the limited authorization code is issued, the identifier of the referent application (server app), the method ID, the number of arguments, and the like are stored in the authorization code table 901 managed by an authorization code management section 209.

Next, the operation during execution of the client application given the limited authorization code will be discussed with FIG. 10.

Here, only STEP 10-1 different from the step in embodiment 1 will be discussed in detail.

(STEP 10-1)

It is assumed that a client application 307 in the secure device 101 is already started.

Processing corresponding to command 1 transmitted from the reader-writer 103 is executed by the application execution section 206 of the secure device 101.

After reading an instruction code meaning a method call, the application execution section 206 takes out address information immediately following the instruction code.

Whether or not the address information is an area permitted for the application is determined and if the area is a permitted area, the address is called.

If the area is "not" a permitted area, an authorization code is recognized and further the type of authorization code is determined.

If the determination result is a limited authorization code, then whether or not the type and description of restriction are satisfied is determined.

For example, when use restriction is imposed, if the remaining number of retries reaches 0, an error meaning "no more use permitted" is issued.

If the remaining number of retries does not reach 0, the limited authorization code is passed to the authorization code management section 209.

To check the remaining number of retries, at the using time, the limited authorization code may be updated or the number of use times may be stored in the authorization code management section 209 and may be compared with the number of use times contained in the limited authorization code.

The authorization code management section 209 reads the index contained in the limited authorization code, takes out the AID of the referent application contained in the table 901, and passes the AID to the inter-card IF execution section 208.

The inter-card IF execution section 208 sets the AID of the referent application in a data part of a response, sets data meaning a request for using the inter-card IF in SW of the response, and transmits the response 1101 to the reader-writer 103.

STEP 10-2 and the later steps are similar to those in embodiment 1 issuing the authorization code and will not be discussed again.

(Issuing of Temporary Authorization Code)

Last, issuing of a temporary authorization code will be discussed.

It is assumed that the application attribute meaning permission of a temporary permission state until a client application is selected after it is downloaded is previously set in the referent existence determination section 210.

Accordingly, if the user forgets to carry a secure device installing the server application, an authorization code for referring to the serve application may be issued by the time the client application is actually used.

The flow until address resolution is started at the application downloading time and information meaning use permission is transferred to the secure device 101 is similar to that in embodiment 1.

In this case, the inter-card IF execution section 208 of the secure device 101 receives information indicating the application to be referred to does not exist and the referent existence determination section 210 determines "NG" and then checks that "temporary authorization code issuing permission" is set and requests the authorization code issuing section 207 to issue a temporary authorization code.

The authorization code issuing section 207 issues "FA02h" as a temporary authorization code in conformance with the instruction 2201.

According to the instruction 2201, FA-FBh of information indicating the address area where placement of application is not permitted is assigned to the top one type, and the latter-half one type represents a permission condition of temporary state.

After the limited authorization code is issued, the temporary authorization code management table 2301 retained by the application execution section 206 is updated.

The temporary authorization state management table 2301 is updated when a temporary authorization code is issued.

When an attempt is made to select an application according to a SELECT command, the application execution section 206 refers to the temporary authorization code management table 2301, checks that address resolution with the server application is not yet executed for the application to be selected, and issues an error meaning application nonusable.

To make it possible to select the application, it becomes necessary either 1) to download the server application to the same secure device or 2) to execute link processing with a different secure device installation the server application.

1) to download the server application to the same secure device, the server application is downloaded according to a known technique and then an address calculation section 205 refers to the temporary authorization code management table 2301 managed by the application execution section 206 and checks existence of a client application waiting for link processing with the server application.

If a client application exists, address resolution is executed using address calculation data retained in the temporary authorization code management table.

After this, the row relating to the client application which has been linked is deleted from the temporary authorization code management table.

2) to execute link processing with a different secure device installation the server application, a link dedicated command is transmitted from the reader-writer 103.

The link dedicated command is made up of a header part where the command can be interpreted as a link dedicated command and a data part containing the identifier of the server application.

When a download management section 201 receives the link dedicated command, the address calculation section 205 refers to the temporary authorization code management table 2301 managed by the application execution section 206 and checks existence of a client application waiting for link processing with the server application.

If a client application waiting for link processing exists, address calculation data retained in the temporary authorization code management table 2301 and the identifier of the server application are passed to the inter-card IF execution section 208, and existence of the referent is checked between the inter-card IF execution section 208 and the different secure device 102.

When the inter-card IF execution section 208 receives information meaning use permission, the referent existence determination section 210 requests the authorization code issuing section 207 to issue an authorization code.

The authorization code issuing section 207 issues an authorization code and the authorization code table 901 is updated.

The referent existence determination section 210 requests the application execution section 206 to delete the row relating to the client application which has been linked from the temporary authorization code management table.

Processing of either 1) or 2) is performed as described above, whereby the later client application selection and execution can be accomplished.

In embodiment 6, issuing of the limited authorization code and the temporary authorization code in addition to the authorization code described in detail in Embodiment 1 and the operation of the applications given the authorization codes have been described.

The limited authorization code enables the number of use times, etc., to be limited without changing the server application side, so that the embodiment can be applied to issuing of a temporary application of a trial copy, etc.

When the client application is downloaded, if the user does not possess the secure device installing the server application, later link processing can be performed according to the temporary authorization code. Accordingly, the scene where although the user wants to download the client application, he or she must give up the idea of downloading the client application because the user does not happen to have the secure device installing the server application at the time is eliminated.

Therefore, the embodiment becomes effective measures against the loss of business opportunities seen from the service provider and the loss of service use opportunities seen from the user.

Embodiment 7

Embodiment 7 is the invention relating to a method of requesting a server application installed in a different secure device to perform processing and using the process data of the server application in a client application.

Embodiment 7 of the invention will be discussed with FIGS. 5 and 24 to 27.

Figure 24:
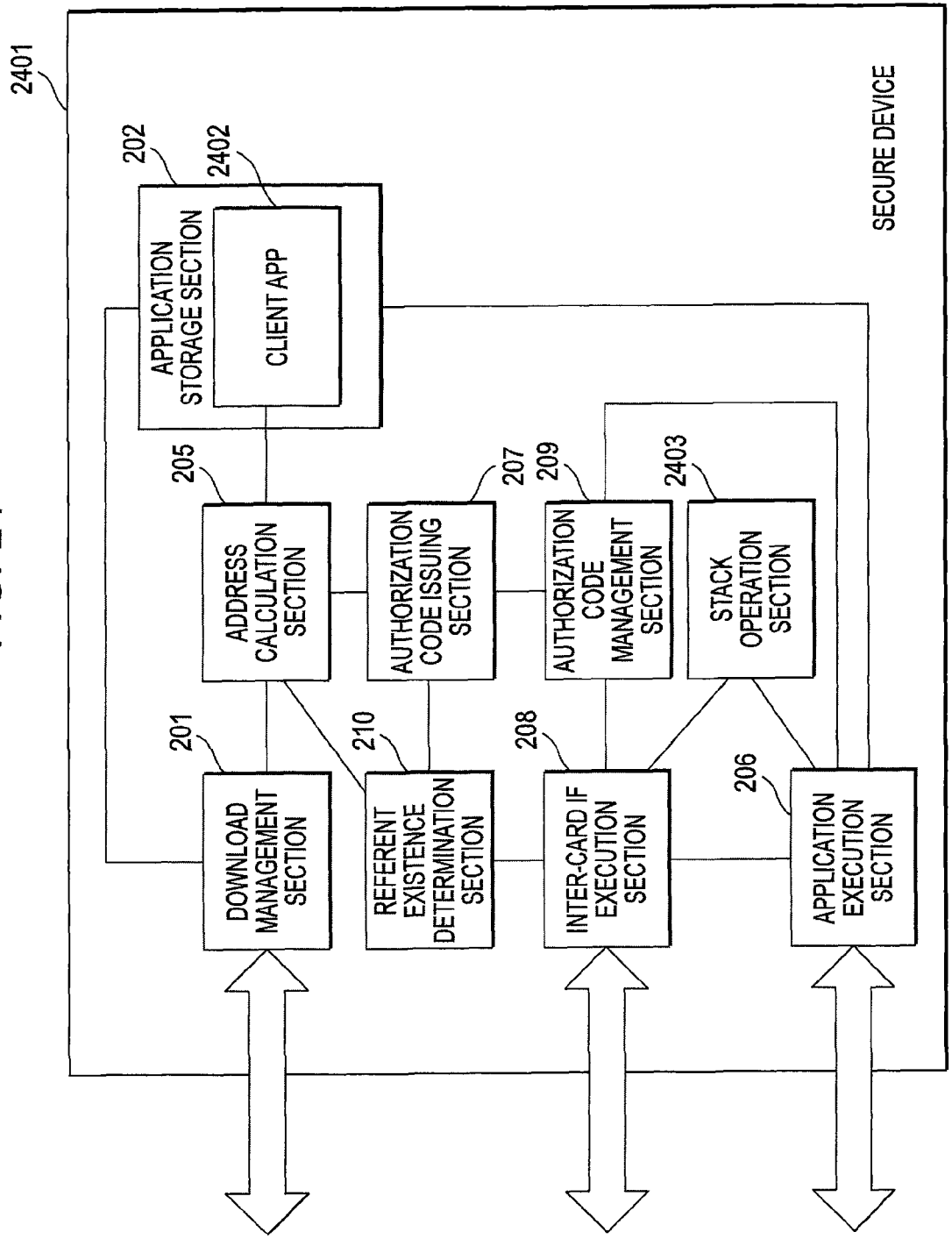
FIG. 24 is a block diagram of a secure device in embodiment 7 of the invention.

FIG. 24 is a block diagram to show the configuration of a secure device 2401 in the embodiment.

A download management section 201, an application storage section 202, applications 203 and 204, an address calculation section 205, an application execution section 206, an authorization code issuing section 207, an inter-card IF execution section 208, and an authorization code management section 209 are similar to those described in embodiment 1.

The secure device differs from the secure device 101 shown in FIG. 1 in a client application 2402 and a stack operation section 2403.

The client application 2402 uses an IF provided by a server application installed in a different secure device 2501.

The stack operation section 2403 operates a stack handled by the client application in using the IF provided by the server application.

Figure 25:
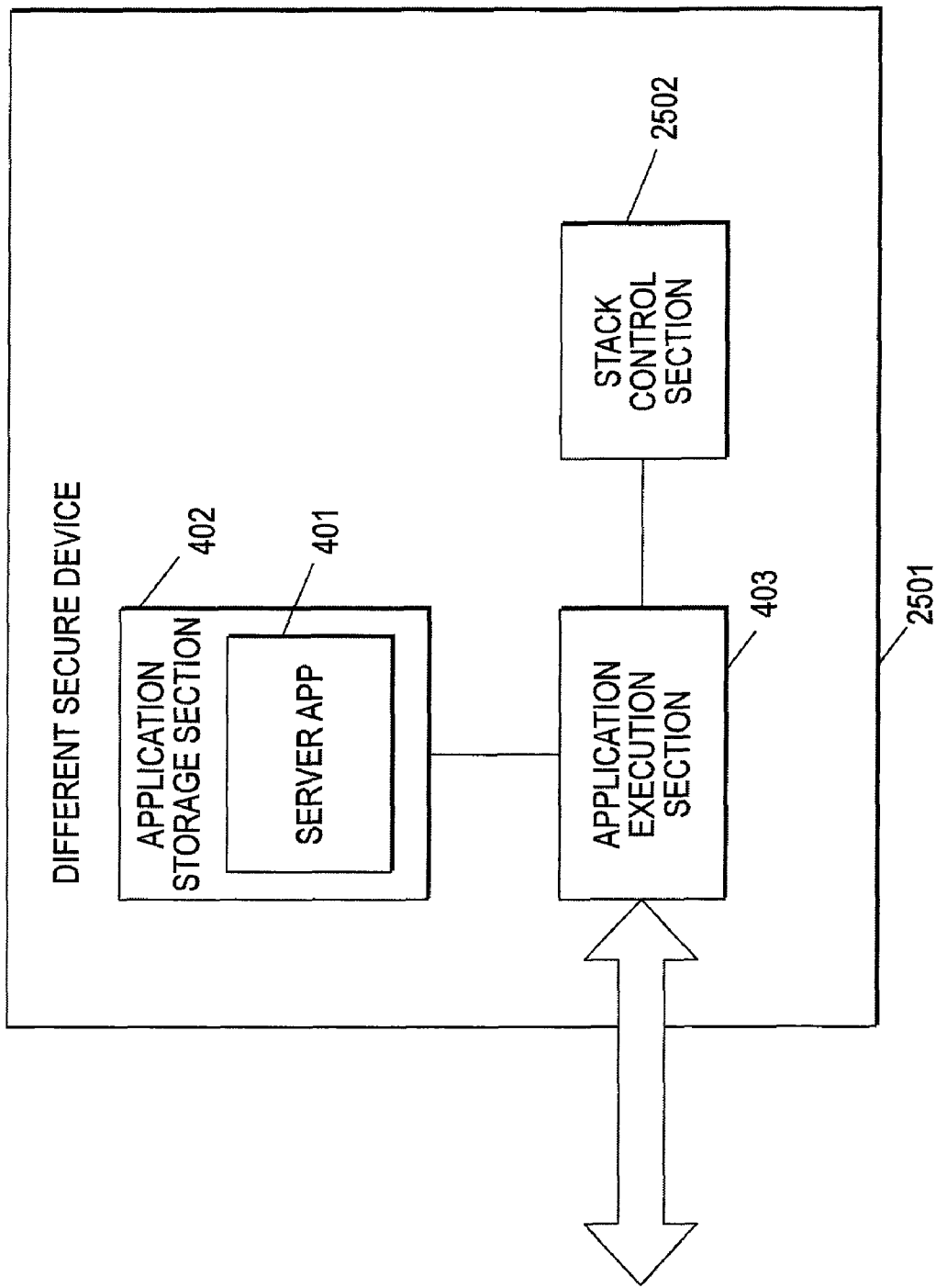
FIG. 25 is a block diagram of a different secure device in embodiment 7.

FIG. 25 is a block diagram to show the configuration of the different secure device 2501 in the embodiment. An application storage section 202, an application execution section 206, and a server application 401 are similar to those described in embodiment 1.

The secure device differs from the secure device 102 shown in FIG. 4 in a stack control section 2502.

The stack control section 2502 performs control for a server application to perform the same operation for a call from a client application installed in the same secure device and a call from a client application installed in a separate secure device.

FIG. 5 is a reader-writer 103 in the embodiment and is similar to that in embodiment 1.

In the embodiment, a system made up of the secure device 2401, the different secure device 2501, and the reader-writer 103 will be discussed.

In embodiment 1, the case where the response from the server application does not contain any data other than SW was described. (See response 1103 in FIG. 11 (*a*).)

If a response is made up of data and SW and the data is used in the later client application processing, the data needs to be stacked.

It is known that if the server application exists in the same secure device, the return value of the processing result in the server application is stacked and is returned to the client application of the caller.

However, if the server application does not exist in the same secure device and a server application in a different secure device is used, the return value is stored in an APDU (Application Protocol Data Unit) in accordance with the communication protocol between the secure devices.

Therefore, to cause the client application to perform the same operation regardless of which secure device the server application exists in, it becomes necessary to extract the return value from the APDU and store the return value on a stack of the client application.

In embodiment 7, a method of using the return value from the server application in the later client application processing will be discussed.

To describe the method, preconditions are described below:

The server application is installed in a different secure device and address resolution of the client application is complete.

The client application is executed and the flow to STEP 10-3 in FIG. 10 is complete.

The preconditions are carried out like the operation of the system described in embodiment 1.

Figure 26:
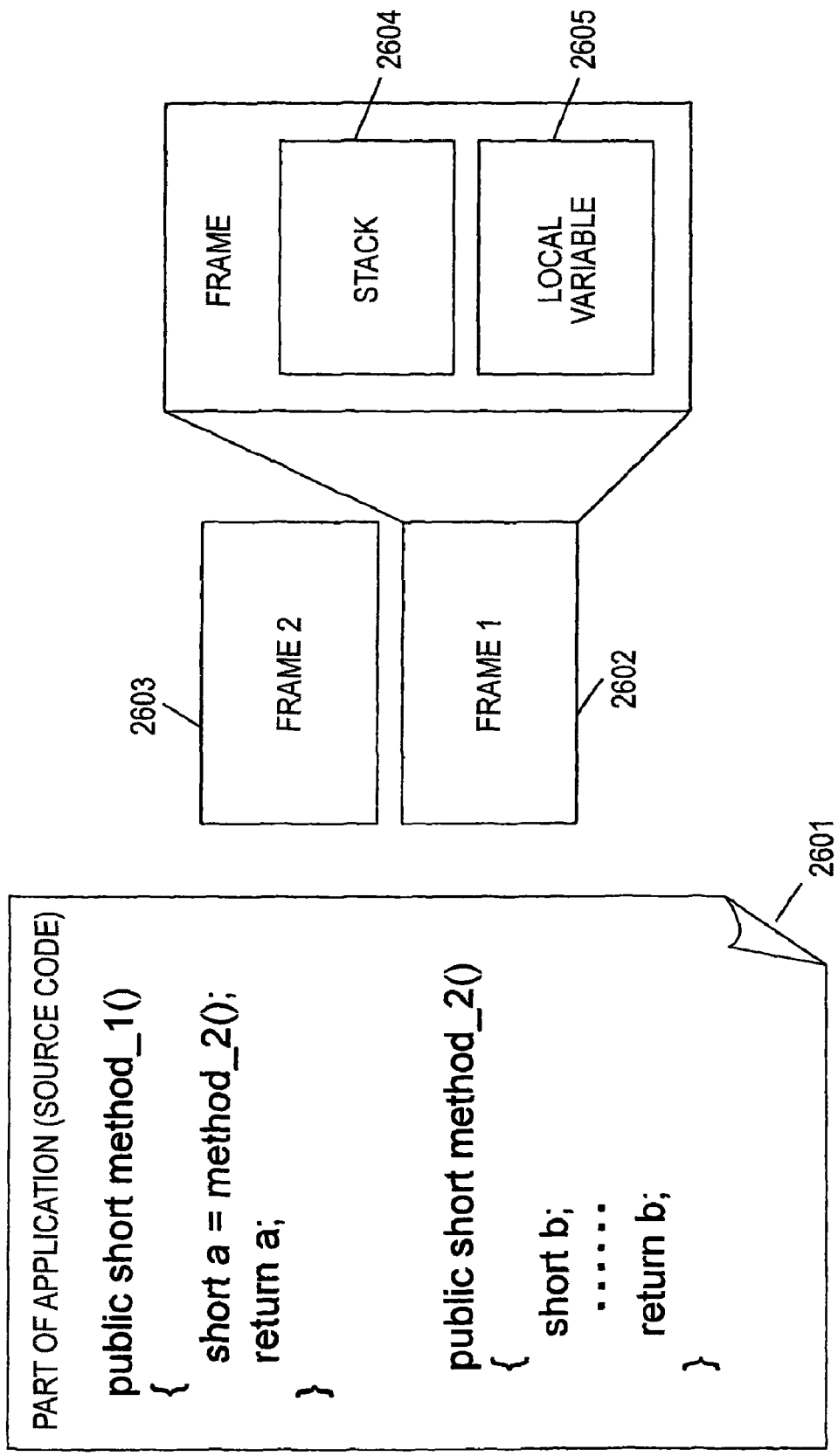
FIG. 26 is a drawing to show an example of frames handled by an application execution section.

The case where "method_1" calls "method_2" as shown in FIG. 26 will be discussed.

The application execution section 206 creates a frame in function units and executes processing. The frame is a work area used to return a value from a function, handle an exception, and store parts of data and the result. Frame 1 is allocated to "method_1" and frame 2 is allocated to "method_2." Each frame is made up of a local variable and a stack.

Frame 2 is generated just after "method_1" calls "method_2." "method_2" performs processing using frame 2 and last returns "b."

The expression "return "b"" is used to mean stacking the value of "b" directly on the stack of frame 1 according to an instruction code of "sreturn." After "b" is returned, frame 2 is erased.

After this, "method_1" continues the processing.

Thus, the function-to-function call is established.

However, if "method_1" and "method_2" exist in different secure devices, the frame of "method_2" which should essentially be stacked on the frame of "method 1" is under the control of the different secure device and thus the processing result of "method_2" cannot directly be stored on the stack of "method_1" of the caller.

Therefore, a mechanism becomes necessary for making it possible to realize processing equal to essential operation for "method_2" to store the processing result directly on the stack of "method_1" in a situation in which "method_2" cannot directly store the processing result on the stack.

Therefore, the stack control section 2502 executes processing different from usual processing for an instruction code involved in operation of a return value (example: sreturn) only at the referring time from the client application installed in a separate secure device.

When called from the client application installed in a separate secure device, a frame of the caller does not exist in an application execution section 403.

In this case, the stack control section 2502 takes charge of processing of "sreturn."

The stack control section 2502 stops writing into the stack of the caller frame and instead creates data shown in FIG. 27.

In the invention described in the embodiment, the data as in FIG. 27 is created and is used, whereby the processing result can be stored on the stack if the client application does not exist in the secure device having the server application.

FIG. 27 is made up of TAG meaning "sreturn," LEGNTH meaning the length of the return value, and Value representing the return values.

This is set in a data part of a response transmitted from the server application and is passed to the secure device 101 for executing the client application as the call result.

Next, the operation of the secure device 2401 after receiving the data will be discussed with FIG. 10.

In the description of the embodiment, the secure device 101 in FIG. 10 is replaced with the secure device 2401 and the secure device 102 is replaced with the different secure device 2501.

STEP 10-1 to STEP 10-4 of the steps when the client application 2402 refers to the server application are similar to those in embodiment 1 and therefore will not be discussed again and STEP 10-5 at which the processing result of the server application is returned will be discussed.

The inter-card IF execution section 208 of the secure device 2401 receives a share command and passes a data part of the share command to the stack operation section 2403.

The stack operation section 2403 interprets TAG meaning "sreturn" and stores Value on the stack of the frame of the caller (client app).

After this, the client application can also continue the processing as with the case where the server application is installed in the same secure device.

In embodiment 6, the method of enabling the client application to use the return value from the server application installed in the different secure device without applying special processing to the codes of the server application and the client application by providing the stack operation section 2403 for the secure device 2401 and the stack control section 2502 for the different secure device 2501 has been described.

The scene where the client application checks and uses the return value from the server application often occurs and the advantage of the system is large.

While the invention has been described in detail with reference to the specific embodiments, it will be obvious to those skilled in the art that various changes and modifications can be made without departing from the spirit and the scope of the invention.

This application is based on Japanese Patent Application (No. 2006-09886.5) filed on Mar. 31, 2006 and Japanese Patent Application (No. 2007-075217) filed on Mar. 22, 2007, which are incorporated herein by reference.

Industrial Applicability

There can be provided the system having the advantage that the memory area of the secure device can be reduced by the secure device and the reader-writer of the invention.

The invention claimed is:

1. A secure device comprising:
an application storage section which stores a first client application as an application for performing data processing;
an address calculation section which determines whether or not the application storage section has a first server application for transferring data to and from the first client application; and
a referent existence determination section which determines, when the address calculation section determines that the application storage section does not have the first server application for transferring data to and from the first client application, whether or not a different secure device has the first server application,
wherein the address calculation section updates an address to a function of the server application, in application code of the client application, based on whether the application storage section has the server application or the different secure device has the server application.

2. The secure device according to claim 1 further comprising an inter-card IF execution section that accesses the different secure device,
wherein the referent existence determination section determines whether or not the different secure device has the first server application, based on the result of the inter-card IF execution section.

3. The secure device according to claim 2 further comprising:
an authorization code issuing section which issues an authorization code for permitting referencing of the first server application when the referent existence determination section determines that the different secure device has the first server application; and an application execution section which executes the first client application based on the authorization code.

4. The secure device according to claim 3 further comprising an authorization code management section which manages at least management information containing an application identifier of the first server application that the different secure device has,
wherein when executing the first client application, the application execution section transmits, to the referent as a response, at least one of the application identifier, a referent, and a parameter to be passed to the referent based on the management information.

5. The secure device according to claim 2 further comprising a security management section which provides security of data transmitted and received by the inter-card IF execution section.

6. The secure device according to claim 3, wherein when the authorization code issuing section issues a use limited authorization code responsive to use restriction of the first client application, the application execution section limits referring to the first server application from the first client application based on the authorization code.

7. The secure device according to claim 3 further comprising a download management section which downloads a second client application, wherein
if the inter-card IF execution section cannot refer to the second server application, the authorization code issuing section issues a temporary authorization code for permitting the download management section to download the second client application.

8. The secure device according to claim 7, wherein when the inter-card IF execution section can refer to the second server application, data communications are conducted between the second server application and the second client application permitted to be downloaded according to the temporary authorization code.

9. The secure device according to claim 3, wherein
the application execution section causes the inter-card IF execution section to acquire the use state of the different secure device having the first server application, and
when the use state indicates a state in which the different secure device cannot be used, the data indicating that the different secure device cannot be used is received by the inter:card IF execution section.

10. The secure device according to claim 3, wherein the address calculation section updates the address to the function of the first server application to the authorization code when the different secure device has the first server application.

11. The secure device according to claim 1 further comprising a stack operation section which causes the application execution section to execute the first client application based on a command from the first server application that the different secure device has and a return value based on the processing.

12. The secure device according to claim 1, wherein
the client application contains viewing right and viewed content, and
the server application checks a condition involved in the viewing right passed from the client application.

13. A reader-writer for controlling transfer of data between a first secure device having a server application and a second secure device for executing a client application, the reader-writer comprising:
an exclusive control communication section which conducts data communications with the first secure device and the second secure device; and
an application control section which manages commands to be transmitted to the first secure device and the second secure device and analyzes responses from the first secure device and the second secure device,
wherein from a time of reception of data indicating inter-card IF use from the first secure device by the exclusive control communication section to a time of reception of data indicating completion of the inter-card IF use, the application control section causes the exclusive control communication section to exclusively transmit a response from the second secure device to the first secure device as a command and causes the exclusive control communication section to exclusively transmit a response from the first secure device to the second secure device as a command.

14. The reader-writer according to claim 13 further comprising:
an owner management section which manages first relation information between a first card ID for identifying the first secure device and an owner of the first secure device and second relation information between a second card ID for identifying the second secure device and the owner of the first secure device; and
a download condition determination section which permits the second secure device to download the client application when the first relation information and the second relation information satisfy a predetermined requirement.

15. The reader-writer according to claim 14, wherein the predetermined requirement is that owner information of the first secure device and owner information of the second secure device are information indicating the same owner.

16. The reader-writer according to claim 14 further comprising an owner information check input section which enters information to determine the validity of the secure device owner.

* * * * *